United States Patent [19]

Logg

[11] Patent Number: 5,616,031
[45] Date of Patent: Apr. 1, 1997

[54] SYSTEM AND METHOD OF SHADOWING AN OBJECT IN MOTION

[75] Inventor: G. Edward Logg, Los Altos, Calif.

[73] Assignee: Atari Games Corporation, Milpitas, Calif.

[21] Appl. No.: 441,588

[22] Filed: May 15, 1995

Related U.S. Application Data

[62] Division of Ser. No. 673,633, Mar. 21, 1991, Pat. No. 5,415,549.
[51] Int. Cl.[6] .............................. G09B 9/34; G09B 9/44; G09B 9/46
[52] U.S. Cl. ........................ 434/38; 434/33; 434/307 R; 395/126; 345/139
[58] Field of Search .................................. 434/29, 30, 33, 434/38, 43, 118, 307 R, 365; 364/578; 395/131, 118, 119, 125, 126; 345/113, 114; 348/122; 273/434, 437, DIG. 28

[56] References Cited

U.S. PATENT DOCUMENTS

| | | |
|---|---|---|
| 3,818,612 | 6/1974 | Myles . |
| 3,889,107 | 6/1975 | Sutherland ........................ 395/131 X |
| 4,352,664 | 10/1982 | Morrison et al. . |
| 4,454,510 | 6/1984 | Crow . |
| 4,467,412 | 8/1984 | Hoff . |
| 4,499,457 | 2/1985 | Hintze . |
| 4,511,337 | 4/1985 | Fortunato et al. . |
| 4,521,014 | 6/1985 | Sitrick . |
| 4,572,509 | 2/1986 | Sitrick . |
| 4,586,038 | 4/1986 | Sims et al. . |
| 4,600,200 | 7/1986 | Oka et al. . |
| 4,633,503 | 12/1986 | Hinman . |
| 4,675,666 | 6/1987 | Peterson . |
| 4,817,948 | 4/1989 | Simonelli . |
| 4,834,374 | 5/1989 | Nakamura et al. . |
| 4,855,934 | 8/1989 | Robinson . |
| 4,924,401 | 5/1990 | Bice et al. . |

(List continued on next page.)

FOREIGN PATENT DOCUMENTS

| | | |
|---|---|---|
| 0315051 | 5/1989 | European Pat. Off. . |
| 2223384 | 4/1990 | United Kingdom . |
| 9003627 | 4/1990 | WIPO . |
| 9007172 | 6/1990 | WIPO . |

OTHER PUBLICATIONS

"Microsoft Flight Simulator", Information Manual and Flight Handbook, 1984 pp. xiii and 25–28.
Foley et al., "Fundamentals of Interactive Computer Graphics", 1982, Addison Wesley, Section 16.2, pp. 575–577.
Air Inferno Brochure, Taito America Corporation, 1990.
F–15 Strike Eagle Article, *Computer & Video Games*, May 1990.
F–15 Strike Eagle Brochure, MicroProse Games, Inc., 1990.
I, Robot Brochure, Atari, Inc., 1984.
G–Loc Air Battle Advertisement, Sega Enterprises, Inc., 1990.
BattleTech Center Brochure, Virtual World Entertainments, Inc., 1990.
Hydra Advertisement, Atari Games Corporation, 1990.
California Games II Advertisement, 1989.
Battlezone Advertisement, Atari Inc., 1980.
Proceedings IEEE/AIAA 7th Digital Avionics Systems Conference 13 Oct. 1986, Fort Worth Texas pp. 315–323; Cpt. Haworth, Loran A.: 'Advanced Cockpit and Control Configurations for Single Pilot Helicopter–Nap–of–the–Earth Flight'.

*Primary Examiner*—Joe Cheng
*Attorney, Agent, or Firm*—Knobbe, Martens, Olson & Bear, LLP

[57] ABSTRACT

A helicopter flight simulator having improvements in visual cues and modeling. The unique visual cues include terrain following shadows and hazing, the latter approximating a set of atmospheric conditions. The unique modeling features include a user selectable zoom, horizontal and vertical ground avoidance, and an autorotation model.

29 Claims, 17 Drawing Sheets

Microfiche Appendix Included
(2 Microfiche, 102 Pages)

U.S. PATENT DOCUMENTS

| | | |
|---|---|---|
| 4,943,938 | 7/1990 | Aoshima et al. . |
| 4,952,152 | 8/1990 | Briggs et al. . |
| 4,970,500 | 11/1990 | Hintze . |
| 4,982,178 | 1/1991 | Hintze . |
| 4,992,780 | 2/1991 | Penna et al. .................. 295/131 X |
| 5,015,188 | 5/1991 | Pellosie, Jr. et al. . |
| 5,021,772 | 6/1991 | King et al. . |
| 5,253,339 | 10/1993 | Wells et al. ..................... 395/131 X |

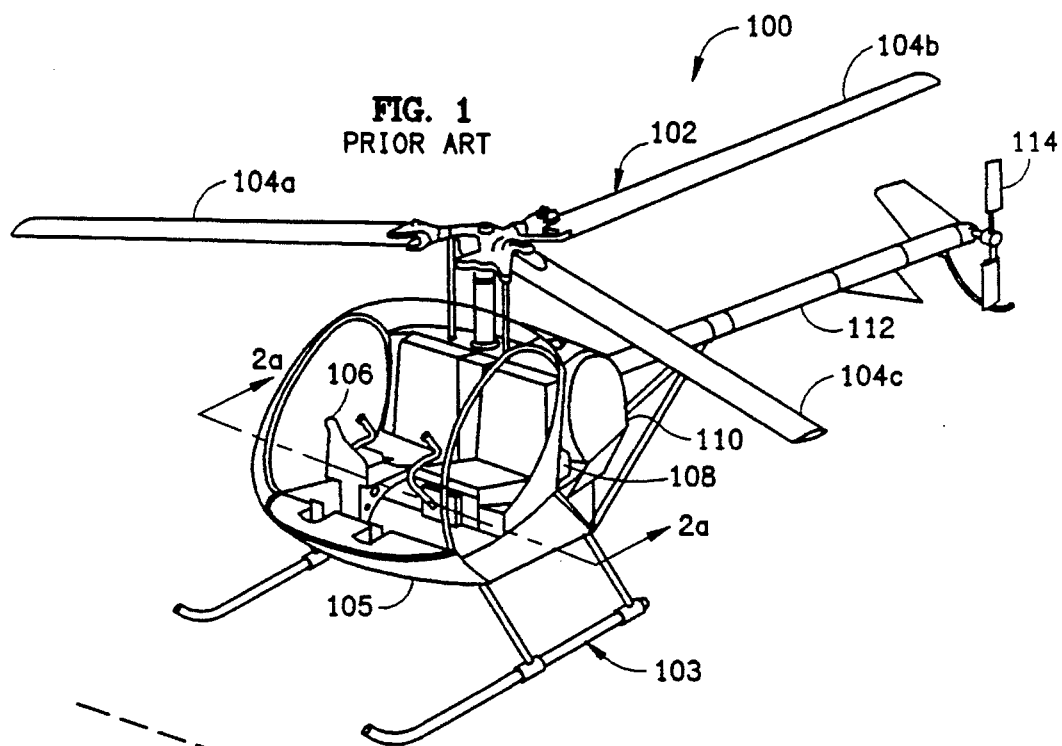
FIG. 1
PRIOR ART
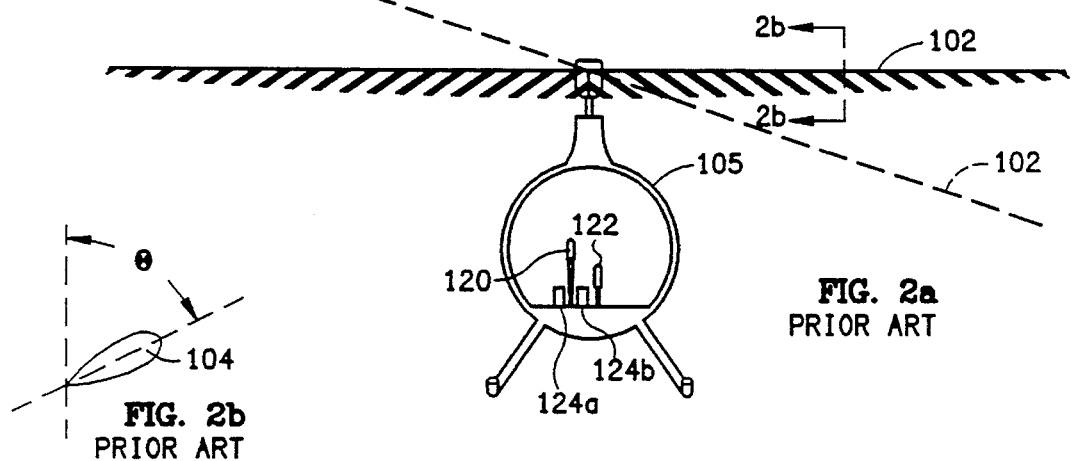
FIG. 2a
PRIOR ART
FIG. 2b
PRIOR ART
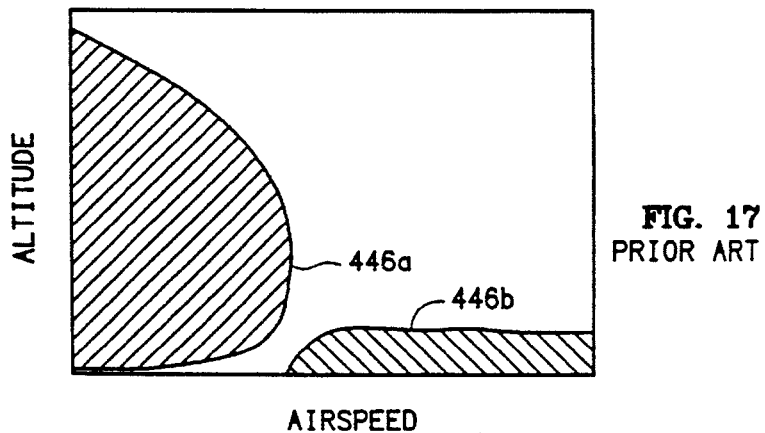
FIG. 17
PRIOR ART

SYSTEM AND METHOD OF SHADOWING AN OBJECT IN MOTION

This application is a divisional of application Ser. No. 07/673,633, filed Mar. 21, 1991, now U.S. Pat. No. 5,415, 549.

BACKGROUND OF THE INVENTION

1. Field of the Invention

The present invention relates to simulation systems and, more particularly, to helicopter flight simulators.

2. Description of the Prior Art

Flight simulators attempt to recreate a flying environment so as to efficiently hone the flying skills of a pilot. Of course, the more realistic the flight simulator, the more accurately the skills learned in the simulator can be transferred to an actual aircraft.

Of particular relevance to the present invention are flight simulators that relate to helicopters, although the present invention includes aspects that are applicable to other flight simulators as well. Helicopter simulators are cost effective means for teaching not only routine flight procedures, but also emergency procedures. For instance, one common emergency procedure for landing without power, called autorotation landing, can be learned on a flight simulator.

To achieve realism, most modern flight simulators apply three-dimensional graphics to a video display. Much effort towards realizing true life video images has been expended in the general area of mapping a three-dimensional world onto a two-dimensional video display. One such system that addresses this problem is described in the patent to Sims, et al. (U.S. Pat. No. 4,586,038).

There has also been much work performed in the general area of accurate simulation modeling, and some of the modeling techniques used in flight simulators have been transferred into the domain of entertainment software and arcade games. In particular, one instance of an arcade game having the general concept of a video simulator game that attempts to replicate helicopter flight is the "Air Inferno" game sold by TaitoAmerica Corporation of Wheeling, Ill.

Nonetheless, while the general concepts of helicopter simulation, computer imaging or animation, and arcade game simulation have been developed over the years, currently available flight simulators lack many possible visual cues which could provide the degree of realism expected by the user of a flight simulator. Moreover, there are a number of modeling issues which have not been properly addressed by flight simulators. Lastly, flight simulators that do exist are usually quite expensive, some on the order of tens of millions of dollars. It would thus be desirable to develop a flight simulator/arcade game for beginner training and entertainment that would cost orders of magnitude less than the noted existing simulators.

Discussing visual cues first, one such cue which has been identified but not adequately implemented is aircraft shadowing. That is, as the aircraft flies, a shadow follows the terrain underneath the aircraft. The aircraft shadow is thus one means of providing the pilot with a perceived cue of aircraft altitude. Previous work on an altitude cue based on the use of landing lights and spotlights during night operations was discussed by Fortunato, et al. (U.S. Pat. No. 4,511,337). In the arcade game domain, which usually requires much less expensive computer hardware and more compact computer software, aircraft shadowing has been implemented in such games as "Hydra", an arcade game sold by Atari Games Corporation of Milpitas, Calif. However, these and other like previously implemented systems have employed shadowing on either a flat ground or on a block or step-like terrain, with attendant limitations as to realism and limited value as a cue to aircraft altitude.

Another more recent implementation of aircraft shadowing is found in the "F-15 Strike Eagle" game manufactured by MicroProse Software of Hunt Valley, Md. This game, which uses polygon graphics to simulate 3D images, provides shadows over hills where the aircraft is not necessarily parallel to flat terrain. Nevertheless, the visual cueing of this game departs from reality in that the aircraft shadow is always in front of the aircraft, or, in other words, the simulated or artificial sun always trails behind the aircraft.

Thus, an important visual cue to incorporate in flight simulators would be a terrain following shadow for airborne objects which could be projected on a sloped terrain at an angle determined by an artificial light source or sun. Such a visual cue would enhance the user's perception of altitude, emulating the aircraft shadow that naturally occurs during low altitude flight.

Simulator training would be improved if accurate atmospheric conditions could be reproduced by a flight simulator. Atmospheric conditions caused by particles in the air or the position of the sun in the sky, for example, will mute and distort the environmental colors perceived by a pilot. The change in coloration can be thought of as resulting from a screen or grid of haze being overlaid on the image. Such a visual cue of color change, henceforth termed hazing, would provide a greater degree of realism in simulators, allowing users to test their flying abilities under varying environmental conditions.

Hazing, or simulating non-optimal atmospheric conditions, is used in some present military simulators to simulate flying in fog, or some other form of haze. However, the known military simulators require expensive computer hardware, including high resolution video displays, to reproduce these effects.

Moreover, with infinite resolution on a video display, the simulation of atmospheric conditions such as fog, smoke, smog, dusk, and the like, would be perfect, i.e., fine droplets or granules could be interleaved with the view. Alternatively, the human eye could be deceived into seeing higher video resolutions than actually available by employing higher rates of video frame update. Unfortunately, most present video systems have limited resolution and slow rates of video update. In addition, the choice of colors in video displays is often limited due to constraints on video memory.

Due to the above-mentioned problems, pilots desiring realistic training having visual cues which change colors according to atmospheric conditions have either had to have access to expensive equipment or have had to simply do without. A flight simulator having the capability to approximate atmospheric conditions using many readily available and reasonably priced video display systems would therefore be a great benefit in training pilots.

In addition to the above stated need for improved visual cues in flight simulators, further advances in aircraft modeling need to be made. First, flight training is enhanced by the ability of a simulator to move the camera away from the viewpoint of the pilot since, among other things, many beginners feel more comfortable flying in "third person", i.e., actually seeing the aircraft being flown. Many video games have used so-called third person perspectives of a graphical universe. More recently, video games have been provided with "first person" views of gameplay by the generation of simulated three-dimensional perspectives such as the specialized computer hardware discussed in Hoff (U.S. Pat. No. 4,467,412).

Changes in viewpoints have also been used to change the viewing angle of a playfield by a "camera" to either an overhead view of the entire terrain or to a ground level view where the ground action is occurring. This type of operation was seen in "I, Robot" an arcade game produced by Atari, Inc. The change of viewpoint in "I, Robot" was further enhanced because it was user selectable, i.e., the user could change the view at any time during the game. Another change in viewpoint function was embodied in the "G-Loc" game sold by Sega Enterprises, Inc., of San Jose, Calif., which simulates air-to-air battles. "G-Loc" changes viewpoints from first person, i.e., the camera is in the cockpit, to third person, i.e., the camera is outside of the aircraft. However, since a player is only backed out of the cockpit into third person if an enemy aircraft is behind the player, the viewpoint change implemented in "G-Loc" is not user selectable.

Others have implemented user selectability but have not addressed improving realism by incorporating a zoom when changing the viewpoint or, if so, have not implemented first-to-third person changes. For instance, another air combat game called "Blue Max", manufactured by Three-Sixty Pacific of Campbell, Calif., allows the player to fly either behind the aircraft or in the cockpit at the press of a button. However, there is no zoom when the viewpoint changes between first and third persons. Lynx, a hand held video game player manufactured by Atari, Inc. of Sunnyvale, Calif., includes a cartridge for "California Games" a skateboarding adventure game In "California Games" the player can change camera angle and camera pitch which, for example, zooms in on a skateboarder at the top of a pipe. Nonetheless, there is no change from first to third person in "California Games".

Thus, although changes in viewpoint and user selectability have been presented in previous arcade games, there is not now either a simulator or a game which provides a user selectable, continuous zoom, between first and third persons. Such a function, including continuous zoom, is desirable to create a flexible, seamless change in viewpoint which, by changing user perspective, increases the educational use of a simulator, or the entertainment value of a game.

Further realism in flight simulators could also be achieved by providing automatic ground avoidance. In the Atari game called "Battlezone", missiles avoided terrain obstructions by performing a "cylinder search", or "conical search", wherein the radius of the search would be reduced with increasing altitude. Once the cylinder search located a height of an object which would cause a collision, the model would move the missile to an altitude which would avoid the interfering object. The "Afterburner" game also available from Sega Enterprises, Inc., provided another form of ground avoidance. However, Afterburner does not include a realistic terrain as the ground is completely flat. The F-15 Strike Eagle game, previously mentioned, provides a degree of vertical ground avoidance at the beginning of the game to prevent a crash, but the type of ground avoidance practiced therein is limited to terrain at sea level altitudes. It would therefore be desirable to provide a flight simulator which avoided terrain of varying altitudes, both horizontally and vertically, and simultaneously simulated the effective aircraft controls to avoid the ground.

One model feature for flight simulators which is specific to helicopters, and has been previously addressed by expensive commercial simulators but not entertainment software or arcade games, is autorotation landings. Autorotation is the flight condition wherein no engine power is supplied to the main rotor of a helicopter. In emergency situations, such as engine failure, the helicopter may be safely landed if the pilot is familiar with the technique. Certainly, simulation of emergency situations is of an extraordinary benefit when compared to having a pilot actually try such a maneuver in flight.

Consequently, a need exists for an improved helicopter flight simulator having the above-identified improvements including visual cues such as terrain following shadows and approximation of varying atmospheric conditions. Further improvements in flight modeling, as mentioned above, are needed, including user selectable zoom, automatic ground avoidance and, in a helicopter simulator, autorotation model features. Perhaps most importantly, it would be desirable to combine one or more of these features in a low cost flight simulator/arcade game for beginner pilots and game players.

SUMMARY OF THE INVENTION

The above mentioned needs are satisfied by the present invention which includes the unique visual cues of terrain following shadows and an approximation of atmospheric conditions. Additionally, the present invention provides improvements in flight modeling including a user selectable zoom, automatic ground avoidance and an autorotation model.

The present invention includes a user selectable zoom system, comprising: a computer having a processor and a memory; a video display connected to the computer; means for simulating, and displaying on the video display, a third person perspective of a vehicle in a universe generated by the computer; means for simulating, and displaying on the video display, a first person perspective of the vehicle in the universe; animation means for generating a continuous sequence of a plurality of views of the vehicle in the universe, said continuous sequence beginning with a presently selected one of the first and third person perspectives and ending with a next selected one of the perspectives, different from the presently selected perspective, said continuous sequence including views of varying distances away from the vehicle; a user selectable control connected to said animation means so that a user can initiate the continuous sequence of views, thereby displaying the next selected perspective on the video display; and control means connected to the computer for maneuvering the vehicle through the universe.

In addition, the user selectable zoom system may be embodied: wherein the user selectable control can be selected by the user while the animation means is generating a sequence of views so as to reverse the direction of sequence generation; wherein the vehicle is a helicopter; wherein the control means includes a collective and a cyclic; wherein the user selectable control includes means for changing the user's angle of view; wherein the user selectable control is a button; wherein the first and third person perspectives have different roll, pitch or yaw angles; and wherein the continuous sequence of views comprises N discrete views differing by a proportional change for roll, pitch or yaw angles as follows:

$$\alpha = \alpha_{in} + \text{view}/N(\alpha_{out} - \alpha_{in})$$

where

α is the calculated angle at this step;
$α_{in}$ is the angle when in third person perspective;
view is the current view step in the continuous sequence;
N is the number of steps in the continuous sequence; and
$α_{out}$ is the angle when in first person perspective.

The present invention also includes a shadowing system, comprising: a computer having a processor and a memory; a video display connected to the computer; means for simulating, and displaying on the video display, an object in a universe generated by the computer, wherein the universe includes a terrain defined by a set of planes which includes at least one plane which is non-parallel and non-orthogonal to any other plane in the set; and collision means for projecting a shadow of the object on the terrain, the position of the shadow depending on the position and direction of a simulated light source located above the object in the universe; and means for displaying the shadow on the video display, thereby improving depth perception.

In addition, the shadowing system can be defined: wherein the object is airborne; wherein the system includes control means connected to the computer for maneuvering the object through the universe; and wherein the simulated light source is positioned in the range of about 30° to about 90° from the horizontal of the terrain.

Furthermore, the present invention includes a ground avoidance system, comprising: a computer having a processor and a memory; a video display connected to the computer; means for simulating, and displaying on the video display, the motion of an object in a universe generated by the computer; control means connected to the computer for maneuvering the object through the universe; collision means for projecting and detecting a collision between the object and a terrain in the universe; and avoidance means for moving the object so as avoid the projected collision by providing the simulating means with a set of control commands subject to the predefined physical limitations of the control means.

Additionally, the ground avoidance system can be defined: wherein the collision means is operable for portions of the terrain having a substantially vertical orientation to the projected path of the object; and wherein the collision means is operable for potions of the terrain having a substantially horizontal orientation to the projected path of the object.

In another aspect of the present invention there is defined a method of coloring a polygon, comprising the steps of: selecting a color palette for a polygon wherein each color of the palette is associated with a different distance from the polygon and angle with a light source; selecting the positions, directions and intensities of a plurality of light source vectors in a computer generated universe; calculating a set of dot products between the light source vectors and the normal to the polygon; summing the dot products and adding a translation factor so as to produce a range of positive values, A; selecting a point on the polygon; calculating the distance, Z, between an observer and the polygon; comparing the distance, Z, to a predefined dimming distance value; offsetting the range, A, by a function of the dimming distance value; and dividing the range, A, by the number of selected colors in the color palette, thereby producing a color number to index the color palette.

Furthermore, the method of coloring can be defined as follows: additionally comprising the step of drawing the polygon on a video display using the indexed color of the color palette; additionally comprising the step of setting the directions of the light source vectors to equal the directions of observer vectors.

Yet another aspect of the present invention is a helicopter flight simulator, comprising: a computer having a processor and a memory; means for simulating, and displaying on the video display, the motion of a helicopter in a universe generated by the computer, the helicopter motion including the velocity of the main rotor and the engine; control means for controlling the motion of the helicopter including controls simulating a collective and a cyclic; means for increasing or decreasing rotor velocity according to the angle of attack of the main rotor; means for compensating cyclic forces as a function of rotor velocity; and means for adjusting the lift and thrust of the helicopter based on the calculated rotor velocity.

In addition, the helicopter flight simulator defined can be defined: wherein the rotor velocity is decreased based on tail rotor drag; wherein the controls include simulated rudder pedals and rudder forces are reduced as a function of rotor velocity; wherein a clutch between the main rotor and the engine is disengaged if the helicopter no longer has fuel; and wherein engine velocity is increased or decreased velocity so as to maintain the desired rotor velocity.

These and other objects and features of the present invention will be become more fully apparent from the following description and appended claims taken in conjunction with the accompanying drawings.

BRIEF DESCRIPTION OF THE DRAWINGS

FIG. 1 is a perspective view of a helicopter;

FIG. 2a is a cross-sectional view of the helicopter shown in FIG. 1, taken along section lines 2a—2a, showing one set of flight controls;

FIG. 2b is a cross-sectional view of the moving rotor blade shown in FIG. 2a taken along section lines 2b—2b;

FIG. 17 is a height-velocity diagram showing the combinations of altitudes and airspeeds when a typical helicopter can safely be landed by using the autorotation technique;

DETAILED DESCRIPTION OF THE PREFERRED EMBODIMENTS

Figure 3:
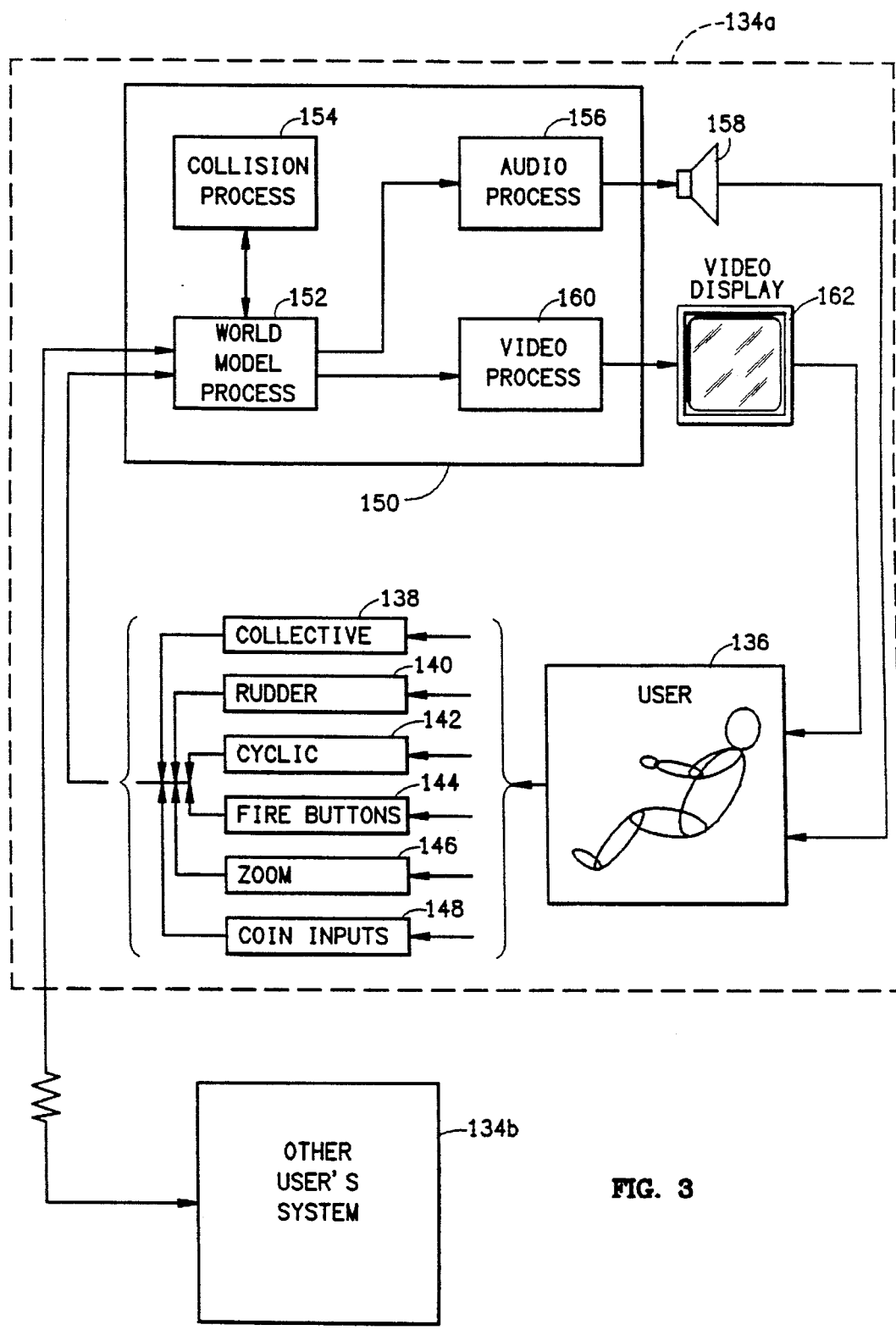
FIG. 3 is a block diagram of the arcade game embodiment of the present flight simulator invention.

Reference is now made to the drawings wherein like numerals refer to like parts throughout.

FIG. 1 illustrates a helicopter which is representative of the type of aircraft benefiting from the flight simulator included in the present invention. The helicopter, generally indicated at 100, has a main rotor 102 mounted on the top of a fuselage 103. The main rotor 102 is a collection of two or more blades such as the three blades 104a, b, c shown in FIG. 1. As is well-known in the field of aerodynamics, the main rotor 102 spins in a counterclockwise direction (in helicopters manufactured in the United States and Europe) so as to create a downwash of air and hence produce lift and thrust to counteract the opposing forces of gravity and drag, thereby allowing the helicopter 100 to fly. The main rotor 102 is thus the principal contributing factor to the helicopter's unique capability of vertical movement and hovering.

The fuselage 103 includes a cabin 105 which is located directly beneath the main rotor 102. The cabin 105 contains at least one seat for a pilot (the pilot is not shown). On an instrument panel 106 inside of the cabin 105, the pilot can monitor airspeed, altitude, and other like information that is critical to the safe operation of the helicopter 100.

An engine 108 (only a portion is shown in FIG. 1), placed behind the cabin 105 of the helicopter 100, powers the main rotor 102. The engine 108 is supplied fuel, typically an aircraft grade of gasoline, from a fuel tank 110.

The helicopter cabin 105 is structurally connected to one end of a tail boom 112. The other end of the tail boom 112 supports a tail rotor 114 which is mechanically driven by the engine 108. The tail rotor 114, or antitorque rotor, produces a thrust to counteract the torque to the fuselage 103 caused by the spinning of the main rotor 102. The pilot can control the attitude of the helicopter 100 around the vertical axis by adjusting the tail rotor 114 as is further discussed below.

Turning to FIG. 2a, a cross-section of the helicopter cabin 105 shows one set of the main flight controls with which a pilot flies the helicopter 100. First, a cyclic control 120 is normally positioned between the legs of the pilot (the pilot is not shown). The cyclic control 120 changes the pitch of each blade 104 of the main rotor 102 during a cycle of rotor revolution so as to tilt the rotor disk (the plane defined by the rotating blades 104). By mechanical linkages (not shown), the cyclic control 120 changes the direction of the lift-thrust created by the moving rotor 102, thus controlling the attitude and airspeed of the helicopter 100. In general, the cyclic 120 can be positioned at any point within the limits of a predefined rectangular path.

The rotor disk tilts downward in the same direction, and with the same approximate displacement from the origin, that the pilot moves the cyclic 120. For example, if the cyclic 120 is pushed to the left (from the perspective of the pilot) then the rotor 102 tilts left as shown in phantom in FIG. 2a.

In this instance, the helicopter 100 moves in a direction which is opposite the relative wind created by the downwash of air, i.e., in a generally upward and leftward direction.

To the left of the pilot is a control stick 122 that is called the collective. The collective 122 moves up and down and, unlike the cyclic 120, simultaneously changes the pitch angle of all of the rotor blades 104, again by means of mechanical linkages. The pitch angle, $\theta$, of the rotor 102 is diagrammatically shown in FIG. 2b where the vertical axis corresponds to a line drawn through the center of the rotor 102. As the collective 122 is raised, the pitch angle of the rotor blades 104 increases simultaneously. Similarly, the opposite action occurs when the collective 122 is lowered. The change in pitch, in combination with a related change in the speed of the engine 108 by way of a throttle on the collective stick (not shown), (e.g., increased pitch when the collective is raised, and increase in engine speed via the throttle so as to maintain the rotor speed), causes the helicopter 100 to increase altitude. Similarly, when the collective 122 is lowered the helicopter 100 drops in altitude. Hence, the collective 122 is the primary means of changing the altitude of the helicopter 100.

The last major control of the helicopter is a pair of rudder pedals 124a, b which are located on the floor of the cabin 105 within easy reach of the pilot's feet. These pedals 124 are connected to the tail rotor 114, permitting the pilot to change the pitch angle of the tail rotor 114. The change in pitch angle of the tail rotor 114 is an effect which is similar to the change in pitch angle discussed above with reference to the main rotor 102 in FIG. 2b. By changing the pitch angle of the tail rotor 114, the pilot controls the degree of antitorque generated by the rotor 114 thus stabilizing the forward attitude of the helicopter 100. The rudder pedals 124 also allow the pilot to control the heading of the helicopter 100 during hovering flight.

When the pedals 124 are in the neutral position, i.e., neither pedal depressed, the tail rotor 114 has a medium positive pitch angle. In this position, the thrust of the tail rotor 114 is approximately equal to the torque of the main rotor 102 and the helicopter 100 remains at a constant heading. If the left rudder pedal 124b is depressed, the tail rotor 144 is given a high positive pitch causing the thrust to exceed the main rotor torque and thus the nose of the helicopter 100 yaws to the left. If the right rudder pedal 124a is depressed, the pitch angle of the tail rotor 144 will range between slightly positive and negative. In this range of pitch, the thrust generated by the tail rotor 114 will not overcome the torque of the main rotor 102 and the nose of the helicopter 100 yaws to the right.

The effects of the helicopter controls 120, 122, 124a, b just described are well-known and they are included by the present flight simulator invention. FIG. 3 shows a block diagram of an arcade game embodiment of a helicopter flight simulator 134 according to the present invention. The arcade game embodiment permits two flight simulators 134a, b to be electrically connected across a high-speed communications link.

The present arcade game embodiment combines the two flight simulators 134a, b so as to allow two users to play individually, cooperatively or competitively. In cooperative mode, the users fly as a team to combat a common enemy. Competitive mode, on the other hand, is a one-on-one aerial engagement between the players.

A pilot or user 136 sits in a booth (not shown) which simulates the actual helicopter cabin 105 shown in FIG. 1. In the game booth, the user 136 can pilot the simulated helicopter by movement of the collective 138, rudder pedals 140 and cyclic 142 shown diagrammatically in FIG. 3 and generally corresponding to the actual helicopter controls 120, 122, 124a, b shown in FIG. 2. A throttle, for controlling engine speed, is presently not provided on the collective 138 because the arcade game embodiment should not be overly difficult for the novice user. Moreover, because the throttle is typically directly related to movement of the collective 138, the throttle can be controlled by the simulator 134 in tandem with movement of the collective 138.

Because the marketplace for arcade games demands the ultimate in adventure, the present arcade game embodiment of the flight simulator 134 is a simulation of an attack helicopter. However, it will readily understood that any other type of helicopter, commercial, emergency, and so on, could be simulated using the present invention.

The attack helicopter simulator 134 includes two fire buttons 144 (not shown individually) which are conveniently located on the handle of the cyclic 142. The first fire button 144 controls a conventional automatic weapon such as a 30 mm cannon. So long as the button 144 is depressed, the cannon fires its rounds. The second fire button 144 controls the firing of missiles. Unlike the cannon fire button 144, the missile fire button requires that the button be released in between missile firings. This is mainly because the simulator 134 considers missiles to be a limited resource weapon (there is a fixed number of missiles) and unwarranted expenditure of missiles detracts from the enjoyment of the user 136. At the present time the missiles are effective during either air-to-air (e.g., fighter jets) or air-to-surface engagements (e.g., buildings).

With the present simulator 134, the user 136 is given a user selectable zoom button 146 for selectively moving between first and third person perspectives of the simulated helicopter as will be further discussed below. Lastly, two coin input devices 148 enable the user 136 to play the arcade game embodiment of the simulator 134 by first depositing coins.

The user inputs 138–148 are electromechanical devices that feed electrical signals to a computer 150. The computer 150 contains four processes, implemented as combinations of computer hardware and software, as shown in FIG. 3. The processes include a world model process 152 which receives the electrical signals corresponding to movements of the user inputs 138–148. In the presently preferred embodiment, the world model process 152 includes a general purpose microprocessor such as a Motorola 68000 or another member of the Motorola 680×0 microprocessor family. The world model process 152 serves to receive the user inputs 138–148, model and maintain the state of the flight "world" or "universe" (i.e., a bounded, three-dimensional geometric model that may be generated and displayed by a computer), and coordinate user feedback. The computer-generated flight universe, or simulated environment, includes stationary objects, such as buildings, the simulated helicopter, and other flying objects such as hostile or enemy fighters and helicopters. Thus, as the simulated helicopter proceeds through the flight universe, the position (Cartesian coordinates) and motion (velocity and acceleration) of the moving objects is updated.

In maintaining the state of the flight universe, the world model process 152 communicates with a collision process 154. The collision process 154 includes a fixed point accelerator called the math signal processor (MSP). Preferably, the MSP is a semiconductor chip such as the 34010 chip available from Texas Instruments of Houston, Tex. The collision process 154 inputs object motion information and projects the flight paths of the various airborne objects and determines whether there will be collisions (which are usually ground collisions). In addition, as will be further discussed hereinbelow, the collision process 154 projects the beams of an artificial sun and where airborne objects block or "collide" with beams of light, the location of a shadow on the earth is calculated and so positioned on the ground.

The world model process 152, after considering collisions and modifying the present state of the flight universe, provides an audio process 156 with a new state of the flight universe. The audio process 156 generates appropriate sound signals for sounds such as rotor whirring, helicopter crash sounds, cannon firing, and the like. These sound signals are transduced by a speaker 158 thus providing audio feedback to the user 136.

The new state of the flight universe is also made available to a video process 160. The video process 160 preferably includes a digital signal processor such as an Analog Devices ADSP-2100 and a graphics processor, for instance, the Texas Instruments 34010 Graphic System Processor (GSP) chip. The ADSP provides the "higher-level" functions of video display such as translation, rotation and scaling, while the GSP efficiently performs the low-level graphics work of writing polygons (so-called polygon graphics) to a video display 162. The video process 160 provides a user viewpoint into the graphical representation of the flight universe. In the preferred arcade game embodiment, the video process 160 generates polygon graphics to the video display 162. One preferred video display 162, such as model no. 25K7171 available from Wells-Gardner of Chicago, Ill., is a multi-synchronous display that can be configured to display 512×288 pixels.

The function of the video process 160 is well-understood technology and, except where specifically indicated, will not be further elaborated herein. One reference which describes many of the features of the graphics function carried out by the video process 160 is the textbook entitled *Fundamentals of Interactive Computer Graphics* by J. D. Foley and A. Van Dam, published by Addison Wesley.

The presently preferred computer 150, in summary, includes the general purpose microprocessor (e.g., Motorola 68000) of the world model process 152, the MSP of the collision process 154, and the ADSP and GSP of the video process 160. The presently preferred computer 150 also includes read-only memory (ROM) comprising: 512 kilobytes of storage for self-test, 512 kilobytes of storage for MSP, ADSP and GSP programs; 2 Megabytes of storage for the 68000 program and tables to define the simulated world; 3 Megabytes of storage to define picture "blits" which include, for example, the control panel (FIG. 4) and mission descriptions of the flight simulator 134; and 2 Megabytes of storage for polygonal objects. Furthermore, the presently preferred computer 150 also incorporates random access memory (RAM) for each processor as follows: 68000—16 kilobytes; MSP—64 kilobytes of program memory (for the program downloaded from the ROM) and 64 kilobytes of data/buffer memory; ADSP—24 kilobytes of program memory (for the program downloaded from the ROM), 16 kilobytes of data memory and 16 kilobytes of buffer memory; and GSP—essentially the same allocation sizes as the MSP.

Computer source code of relevant portions of the world model process 152 and the collision process 154 is attached herewith in the accompanying microfiche appendix.

Figure 4:
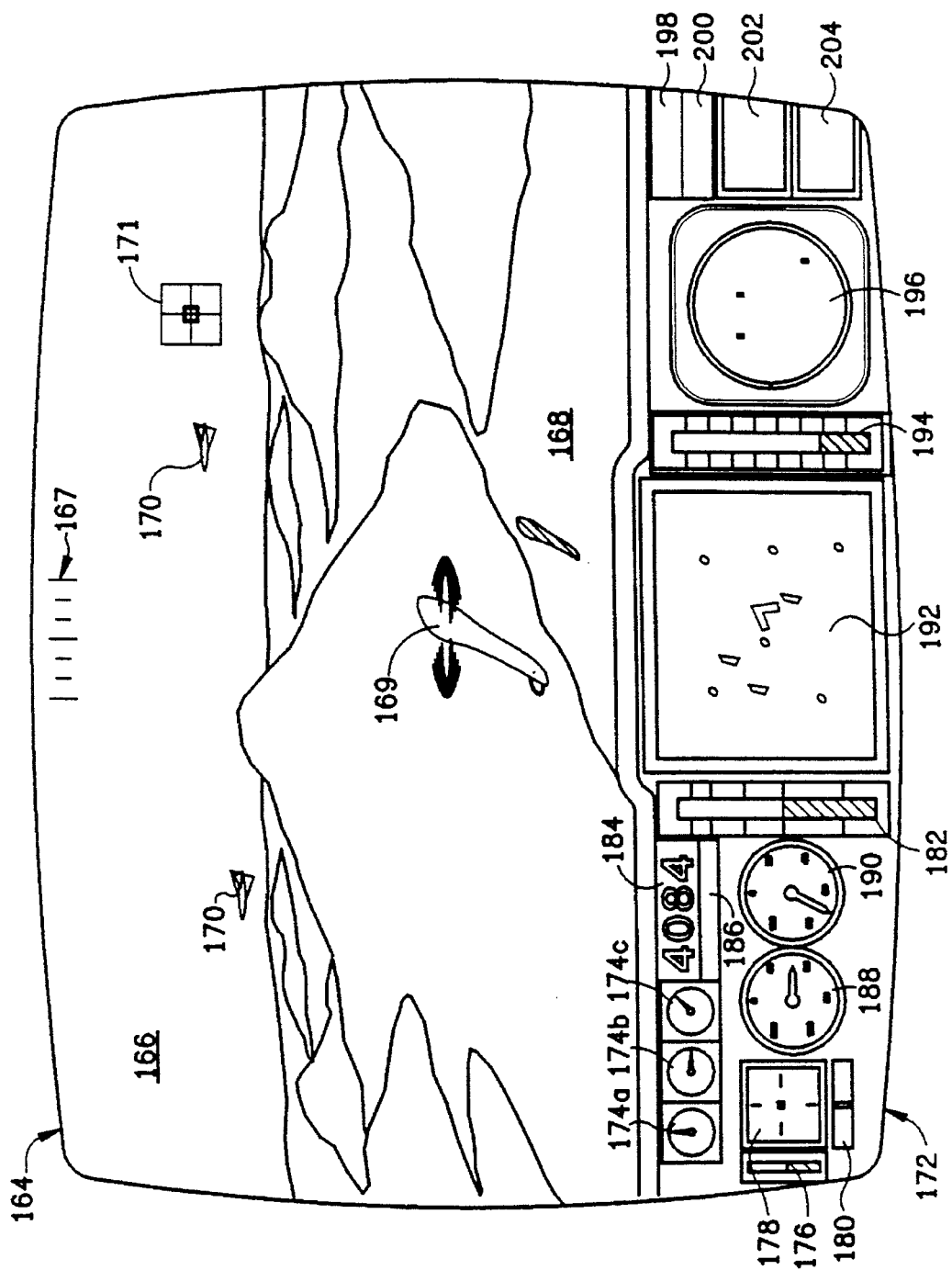
FIG. 4 is a screen display, presented on the video display shown in FIG. 3, showing a third person perspective into the flight universe, wherein the screen display includes the presently preferred instrument panel.

FIG. 4 is a representative screen display of the presently preferred embodiment of the flight simulator 134 shown in FIG. 3. The screen display, presented on the video display 162 (FIG. 3), is a third person perspective out of the simulated version of an actual helicopter cabin such as the one indicated by reference numeral 105 in FIG. 1. The view of the user 136 is into a simulated flight universe 164. At the top of the screen display a heads-up compass 167 is output on the video display 162 (FIG. 3). The flight universe 164 includes a sky 166, a terrain or ground 168, a simulated helicopter 169 and a number of aircraft 170 (which, in the preferred embodiment, are generally hostile but may include another friendly helicopter piloted by a user at the flight simulator 134b). The screen display also includes a heads-up targeting reticle 171 for "locking on" to a target. The reticle changes color, e.g., from white to red to indicate a target lock.

Directly beneath the view into the flight universe 164, an instrument panel 172 is displayed on the video display 162 to heighten the reality of the flight simulator 134 (FIG. 3) by providing the user 136 with visual flight indicators such as those commonly found on an actual instrument panel 107 (FIG. 1).

Identifying the instruments and indicators of the instrument panel 172 from left to right are as follows: reserved gauges 174a, b, c, collective position indicator 176, artificial horizon 178, rudder position indicator 180, rotor speed indicator 182, score window 184, running time window 186, airspeed indicator 188, altimeter 190, video map/camera view of target 192, fuel gauge 194, radar display 196, limited resource weapon (e.g., missile) window 198, number remaining window 200, radar jammer light 202 and missile jammer light 204. The reserved gauges 174 are non-operable gauges which are reserved for future use. The collective position and rotor speed indicators 176, 180 display vertical bars of light as, for example, LCDs would display in an actual aircraft, which increase or decrease in height according to their respective inputs. The artificial horizon 178 shows the pitching and banking attitude of the helicopter with respect to the horizon. The rudder position indicator 180 includes a needle which moves from side to side according to changes in the rudder pedals 140 (FIG. 3). The score window 184 is a current tally of points that the user 136 has accumulated during the simulation (or game). The running time window 186 displays the current time since the start of the mission with resolution down to tenths of a second.

In the center of the instrument panel 172, the video map 192 reproduces a black and white video map and positions of color-coded ground objects (e.g., flashing color dots) that were previously detected by satellite, radar and/or other means of intelligence gathering and preloaded or downloaded to the helicopter 169. The video map 192 also displays a close-up video image of a target after the reticle 171 is locked on. The airborne objects are also displayed by themselves on the radar display 196. The fuel gauge 194 is another vertical light bar indicator where less height indicates less fuel. The limited resource weapon window 198 currently displays the selected limited resource weapon, e.g., missile. The number remaining window 200 displays the number remaining of the limited resource weapon currently in use. The radar jammer light 202 will flash when a missile guidance radar from another aircraft is detected and automatic radar jamming is in progress. The missile jammer light 204 flashes when a surface-to-air missile (SAM) guidance radar is detected and automatic SAM radar jamming is in progress.

Figure 5A:
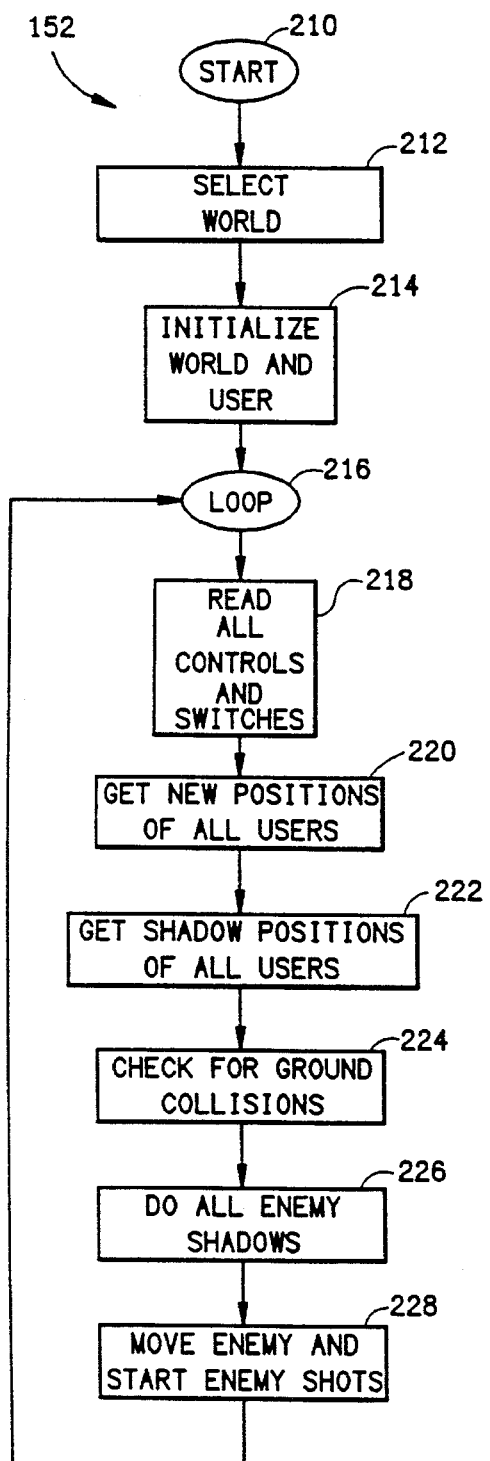
FIGS. 5a, b are flow diagrams of the world model process shown in FIG. 3.

FIGS. 5a, b form a portion of the flow diagram for the world model process 152 shown in FIG. 3. The world model process (or just "world model") 152 of the present invention thus includes a computer program which is illustrated in diagrammatic flow format and generally designated at 152 in FIG. 5. In the presently preferred embodiment, the world model 152 is written in the "C" language and cross-compiled on a Digital Equipment Company VAX computer using a Green Hills Software, Inc. "C" compiler available from Oasys, a division of Xel, Inc. of Waltham, Mass. The world model 152 is then executed on the Motorola 68000 microprocessor located in the computer 150. However, one skilled in the art of computers will recognize that many other computers, computer languages and compilers, including more than one of each, may be used to achieve the same result.

After entering the flow at a start state 210, the world model 152 moves to state 212 to have the user 136 (FIG. 3) select a world. To select a world, the world model 152 uses the video display 162 to present the user 136 with a menu of possible worlds presently including Training, Advanced, Canyon or Head-to-Head (the latter only available for two players or users). From state 212 the world model 152 transitions to state 214 to initialize the world and the user. This initialization tells the user 152 what world was selected and explains the mission plan in text on the video display 162. Also, if there is more than one user then the model 152 requests from the other flight simulator 134b (FIG. 3) what world should be used as the worlds must be consistent if both users are to be active in a single universe.

Figure 5A:
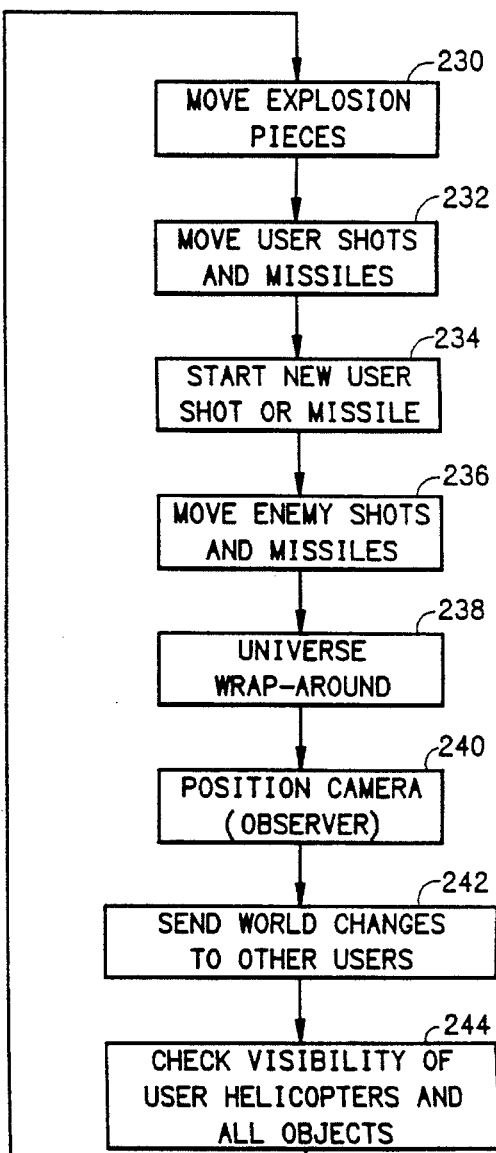
Figure 5B:
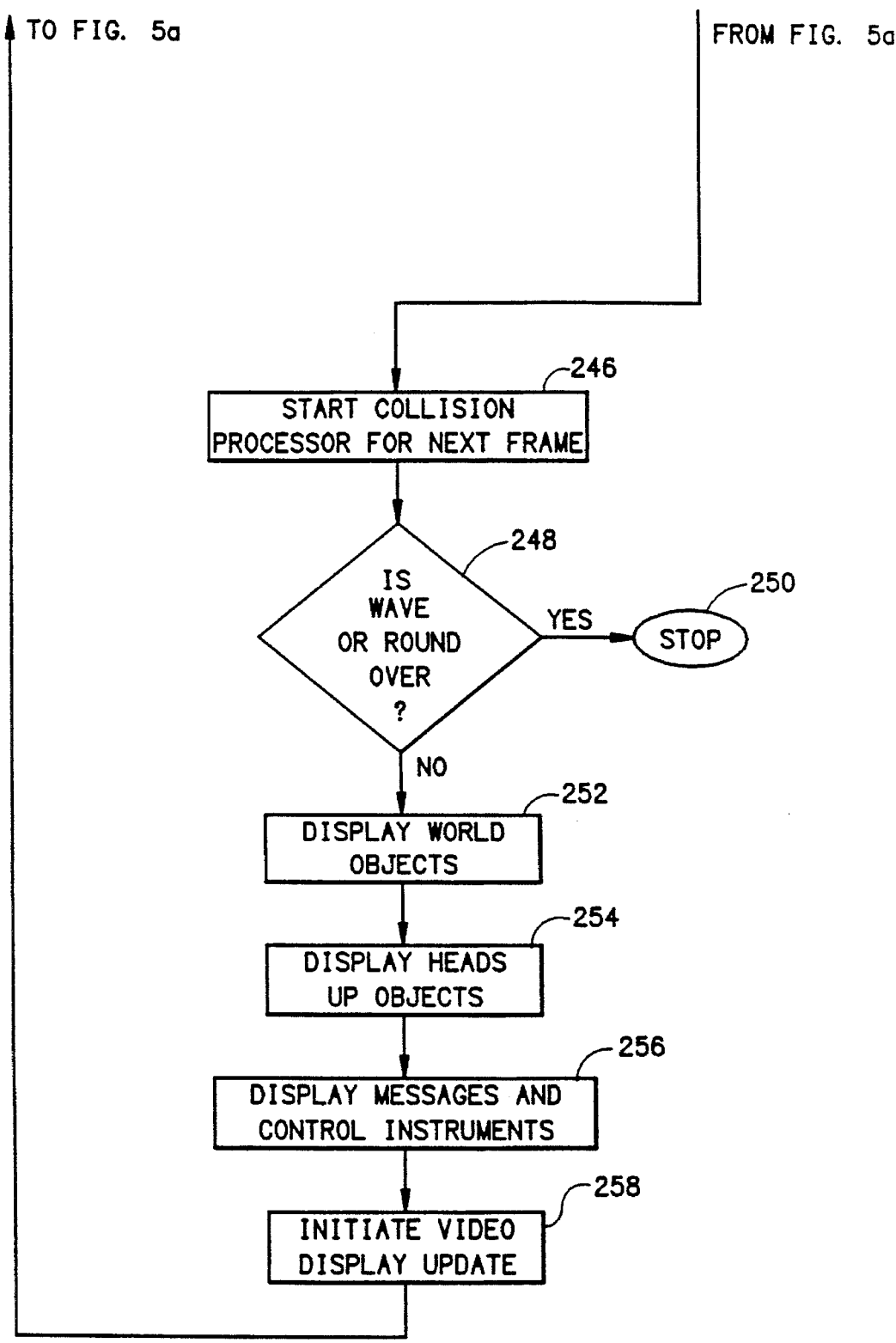

Moving to a loop state 216 the world model 152 enters the main loop of the control flow shown in FIG. 5, also called the display cycle. At function 218, the controls and switches of the flight simulator 134 are read. Among the switches, the zoom button 146 (FIG. 3) is read to determine whether the user 136 has toggled the zoom direction between first and third persons as will be further discussed below. The controls will be read and their positions input to the motion modeling portion (not shown) of the world model 152. (Motion modeling, or updating position, velocity and acceleration information of the helicopter, as referred to herein, is a well-understood technology.) Thereafter, at state 220, the world model 152 requests the position of the other user, i.e., the user (not shown) at the flight simulator 134b (FIG. 3), if applicable, so that all users have known positions in the world model 152. This position information will comprise the three-dimensional Cartesian coordinates associated with the other user. In addition, at state 220, the new user position is calculated based on the motion model.

Proceeding to a shadowing function 222, the world model 152 requests the collision process 154 to provide the position of the shadow on the terrain 168 (the terrain 168 comprises various polygonal shapes such as cones, cylinders, pyramids, vertical walls and the like) that results from the sun "colliding" with the helicopter 169 controlled by the user 136. At the next state, state 224, based on the shadow position determined by the collision process 154, e.g., is the shadow in the same position as the helicopter 169, the world model 152 checks whether the simulated helicopter 169 has impacted the ground. Ground collision may initiate an explosion, and the parameters of the explosion (e.g., the roll angle of each explosion piece) depend on whether the user's helicopter 169 collided with a cliff, hill, aircraft, or the like.

For all non-shadow collisions and explosions in the world model 152, the sounds are immediately generated via the audio process 156 and the speaker 158 of FIG. 3. Also, it should be understood that engine and rotor related sounds (such as the "whoosh-whoosh" noise due to the motion of the main rotor through the air) are being continuously generated by the audio process 156 and the speaker 158 using well-known audio processing techniques.

Moving to shadowing function 226, the world model 152 requests the collision process 154 to provide all enemy aircraft shadows. The world model 152 then transitions to state 228 to move enemy aircraft and start enemy shots. In the presently preferred embodiment, the enemies only shoot straight ahead. However, each type of enemy has its own shooting or moving (e.g., evasion) algorithm. For instance, an enemy helicopter will avoid the user's helicopter by "turning off" if the enemy helicopter is within a predetermined range, e.g., 300 feet. Otherwise, assuming that the enemy helicopter or fighter has a straight-on shot, there is a preselected maximum radar and shooting range, such as 2600 feet, which is as far as the cannon shots will travel in one second.

The world model 152 next moves pieces of an explosion at state 230. Each piece of all explosions, for instance, an enemy aircraft that was hit by a missile, is updated in roll, pitch and yaw coordinates. At state 232, the world model 152 moves previously fired user shots, i.e., cannon fire, and missiles by first communicating with the collision process 154. The collision process 154 was previously given missile and shot positions and velocities such that the calculation has already been made at the time of the request by the world model 152. If there is a collision with an object then the state of the object is changed to explosion or damaged. A damage condition can result if what was fired on has armor protection, for example.

Then, moving to state 234, the world model 152 reads the fire buttons 144 (FIG. 3) and examines the arming status of the selected weapon. Each weapon has a predetermined firing frequency and if one of the fire buttons 144 is pressed but the weapon is not yet armed, action will not take place until a later display cycle. For example, in one embodiment there is a one second delay between pressing the fire button 144 and launching a missile.

After handling the fire buttons 144 at state 234, the world model 152 transitions to state 236 wherein the enemy shots and missiles are moved. The state 236 is similar to state 234 for moving the user's shots and missiles (both of which are termed "rounds") which was previously discussed. In particular, after moving all rounds according to a standard motion model, the world model 152 requests a collision status for each round from the collision process 154 (FIG. 3). The collision process 154 then communicates back to the world model 152 whether the rounds missed or hit the user's helicopter 169 or hit some other object such as a hill.

Now, moving to state 238, the world model 152 wraps around, if necessary. No wrapping would be necessary if the flight universe 166 was large enough. However, to conserve on computer memory, the universe 166 is made a certain size which may wrap from either the left-to-right edge (or visa-versa) or the top-to-bottom edge (or visa-versa) if the user helicopter 169 reaches one of these edges. The present flight universe 166 is, as an example, 8,000 feet by 8,000 feet in size.

From state 238, the world model 152 moves to state 240 so that the position of the camera (or observer) in the flight universe 164 (FIG. 4) is modified. The camera position or viewpoint can, for example, be first person (inside the helicopter) or third person (outside the helicopter). Also, as the simulated helicopter 169 moves the camera is moved to maintain a fixed position in the flight universe 164 relative to the helicopter. For instance, in third person perspectives the camera is placed behind and above the helicopter. Furthermore, depending on the status of the zoom button 146 (FIG. 3), the camera may step the zoom as will be further discussed hereinafter. The world changes attributed to the user's helicopter, e.g., crash, shot fired, and so on, are then communicated to the other flight simulator 134b (if multiple user mode selected) at state 242.

Transitioning from state 242 to state 244, the world model 152 checks the visibility of the simulated helicopter 169 corresponding to the other flight simulator 134b and other objects. To accomplish this task, the world model 152 requests information from the collision process 154. The collision process 154 returns what airborne objects can be seen on the radar display 196 (according to a preselected radar range) and what objects can be seen visually. Certain objects, for example, may be obscured by hills or are beyond a predetermined visibility range. Then, moving to state 246, the collision process 154 is provided with motion changes in this display cycle so that calculations will be available for the next display cycle. In other words, the collision process 246 makes calculations for the current display cycle based upon data supplied by the world model 152 from the previous display cycle.

After initiating calculations in the collision process 154, the world model 152 moves to a decision state 248 to decide whether the current round, or wave, is complete. The simulated helicopter 169 may be shot down, crashed into a hill, out of fuel, or otherwise not able to finish the mission but having a state requiring termination of the wave. If the wave is determined to be over and requiring termination, then the world model 152 enters the stop state 250 and awaits the next user 136. In the arcade game embodiment, the flight simulator computer 150 (FIG. 3) would at this point enter the so-called "attract" mode to actively attract another user.

On the other hand, if at state 248, the wave is not over, or if the user 136 has accomplished the particular mission that was selected at the state 212, then the world model 152 continues. If the user 136 completed the mission, then the user 136 is given positive feedback such as extra points, fuel and/or missiles.

In the case of the wave continuing, the world model 152 moves from decision state 248 to state 252, to notify the ADSP and GSP of the video process 160 (FIG. 3) of the locations of polygons associated with objects, such as the simulated helicopter 169, and the position of the camera and artificial sun. The video process 160 then displays the image of the flight universe 164 (FIG. 4), as seen from a specified camera viewpoint, on the video display 162. Moving to heads-up display state 254, the world model 152 communicates flight information to the video process 160 that thereafter is displayed on the video display 162 in the form of the compass 167, instrument panel 172 and reticle 171.

The world model 152 then moves from state 254 to state 256 wherein the video process 160 is requested to display messages and the instruments that show the status of certain of the controls 138, 140, 142 (FIG. 3). Moving to state 258, the world model 152 initiates the update of the video display 162 by first waiting to be sure that the video process 160 has completed the display of the last video frame, and then sending a command to start the display of the next frame. The world model 152 has then completed one iteration of the display cycle and continues by beginning another cycle at the loop state 216.

Figure 6A:
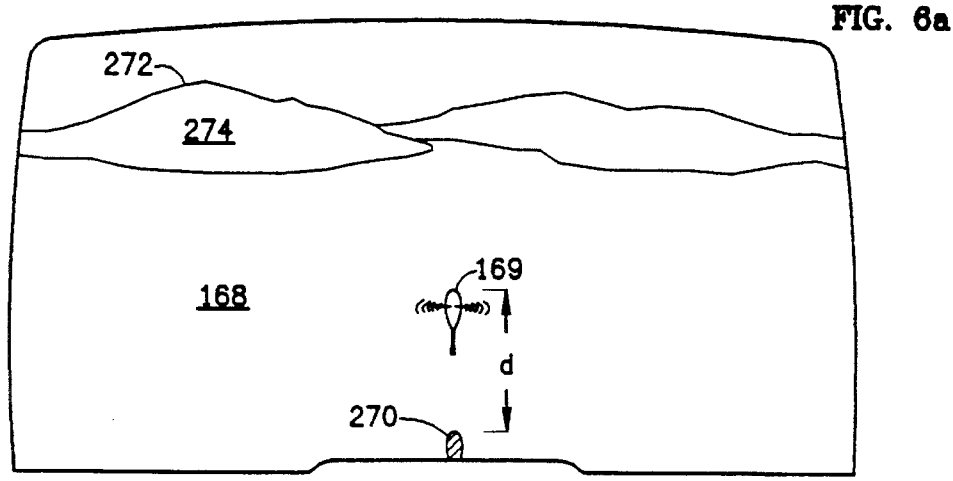
FIGS. 6a, b, c are a sequence of screen displays showing the terrain following shadow aspect of the present invention.
Figure 6B:
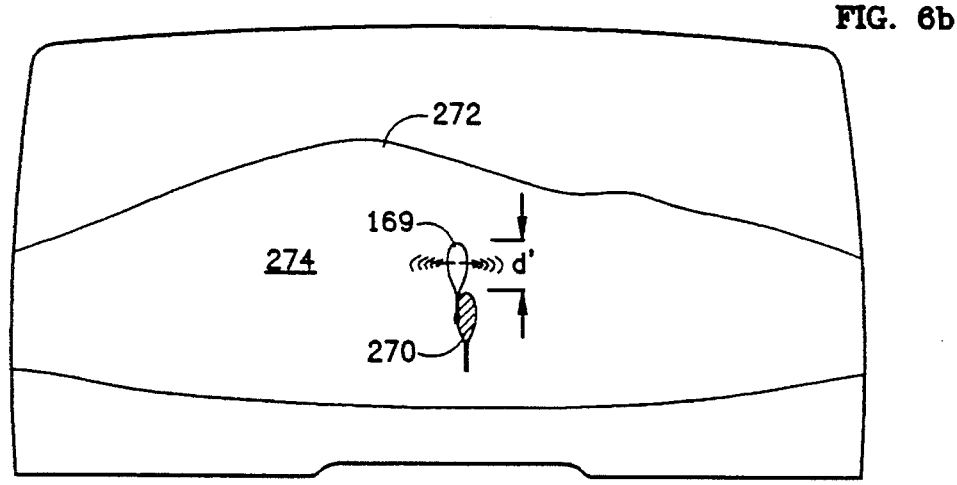
Figure 6C:
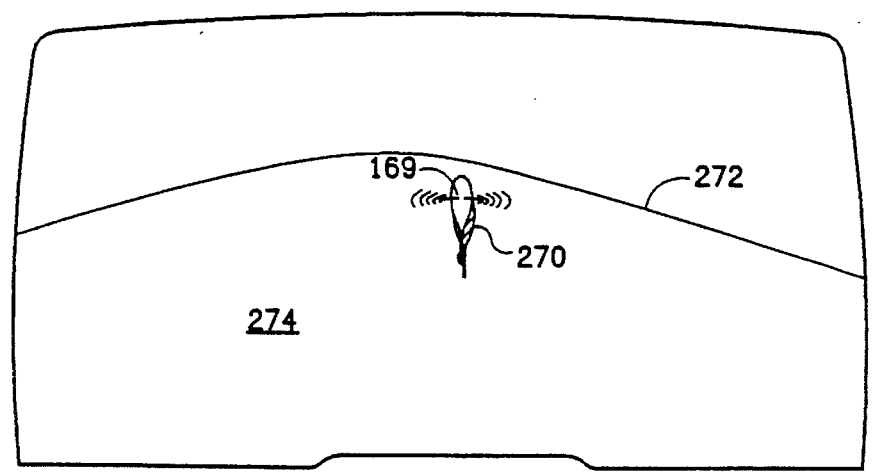

FIGS. 6a, b, c are a sequence of screen displays that illustrate the visual cue of terrain following shadows according to the present invention. Of course, the screen displays of the present invention, including scenes like FIGS. 6a–c, are computer animated on the video display 162 such that a portion of the flight universe 164 is displayed at any one time. The flight universe 164 is thus preferably designed by one or more artists who use a computer animation tool such as, for example, the Super 3D program that is licensed by Silicon Beach Software of San Diego, Calif.

In general, the shadow of an aircraft is an important altitude cue to a pilot who is engaged in low altitude maneuvers such as the so-called nap-of-the-earth flying. Clearly, the aircraft shadow is mainly of use as a visual cue during daylight hours when the sun is relatively high in the sky e.g., 30° to 90°; and a clear shadow is visible.

In FIG. 6a, the simulated helicopter 169 is shown to be flying at a generally fixed, low altitude, e.g., 50 feet. An artificial sun (not shown) generates essentially parallel beams of light that "collide" with the helicopter 169 as described above with respect to the shadowing function 222 of FIG. 5a. The collision source is projected on the terrain 168, according to the angle the sun and helicopter 169 make to the terrain 168, so as to form a helicopter shadow 270. The shadow 270 is approximately the same two-dimensional size and shape as the helicopter 169, about 60 feet long in one present flight universe 166 and is shown to be a distance, d, from the helicopter 169.

The helicopter 169, of FIG. 6a, traverses the terrain 168 into the flight universe 164 towards a pyramid-like hill 272 in the background of the third person perspective. The hill 272 has a front face 274 which forms a plane that is intersected by the projected flight path of the helicopter 169. The height of the hill 272 is somewhat less than the altitude of the helicopter 169.

As the helicopter arrives at a point above the front face 274 of the hill 272 in FIG. 6b the distance, d', between the helicopter 169 and the shadow 270 has noticeably decreased providing a visual cue to the user 136 that the helicopter 169 is nearing the front face 274. In FIG. 6c, the distance between the helicopter 169 and the shadow 270 has further diminished to the point where the helicopter 169 overlaps the shadow 270 nearly completely. Thus, the situation represented by FIG. 6c is a clear visual indicator to the user 136 (FIG. 3) that the altitude difference between the helicopter 169 and the hill 272 is quite small and that, consequently, extreme care should be taken in avoiding a ground collision.

Figure 7:
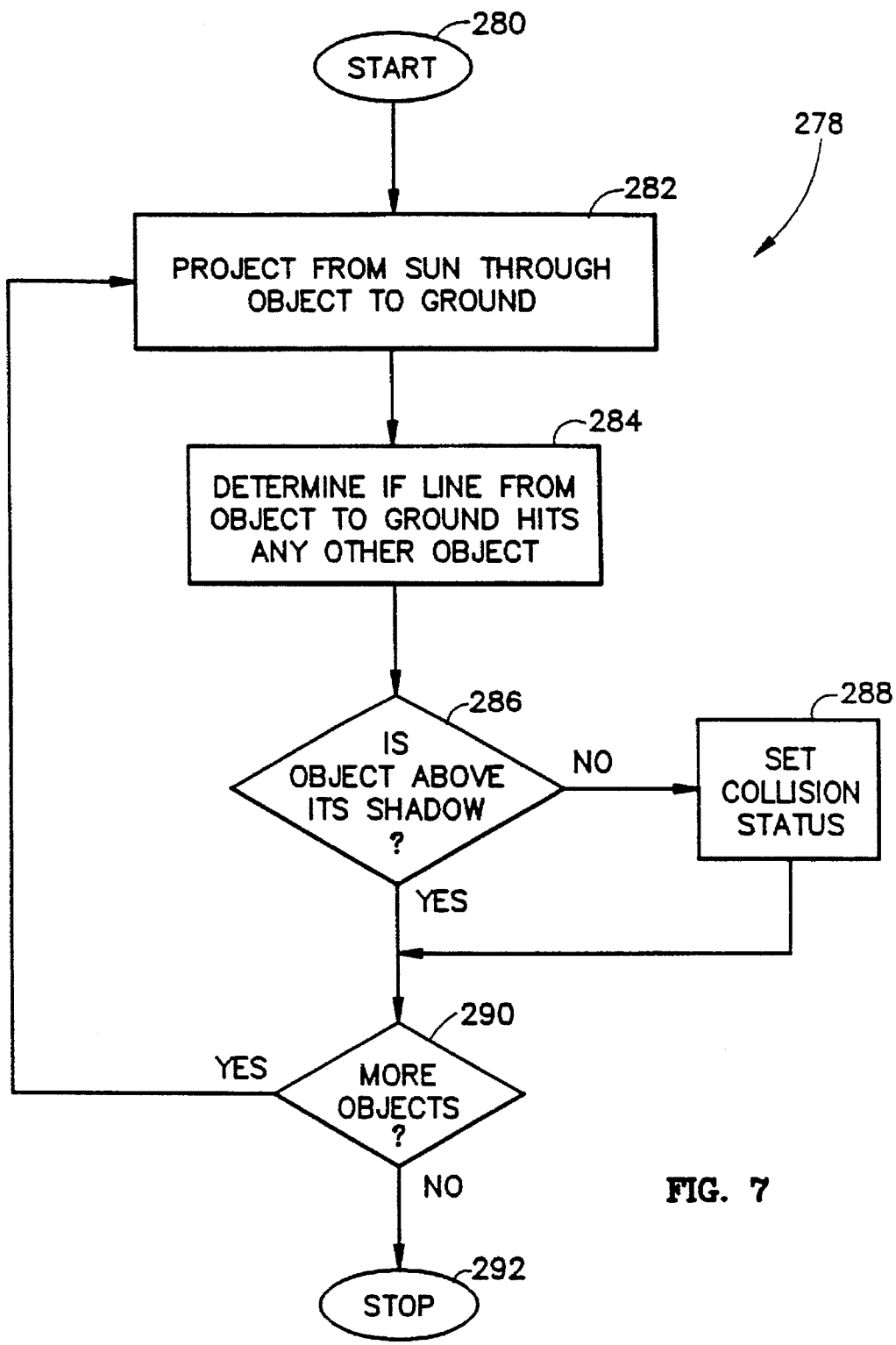
FIG. 7 is a flow diagram of the terrain following shadow function of the present invention.

Referring now to FIG. 7, the diagram shows the principal portion of the control flow associated with the shadowing functions 222, 226 of FIG. 5. The world model 152 (FIG. 3) simply requests information from the collision process 154 and then processes the returned collision data. Hence, the control flow of FIG. 7 is mostly carried out by the collision process 152 using the MSP.

After entering the flow at a start state 280, a shadowing function 278, utilized by the world model functions 222, 226, moves to a state 282 wherein a line is projected from the artificial sun through an airborne object, such as the helicopter 169 (FIG. 6a). Next, at state 284, the shadowing function 278 determines if the projected line from the object to the ground 168 intersects another object in which case the shadow is displayed on the object rather than the ground 168. If the projected line does not intersect another object, a shadow object 270, e.g., FIG. 6a, is created on the terrain 168. The shadow object will have the same shape and dimensions as the object creating the shadow. Note that the size of the shadow is the same regardless of the distance the object is from the shadow since, on the earth, when the sun is high in the sky it is seen to emit essentially parallel rays of light.

At decision state 286, arrived at from state 284, the shadowing function 278 decides if the object is above its shadow. Since the present embodiment uses relatively inexpensive computer hardware, only one point of the helicopter 169 is used to generate the shadow (e.g., shadow 270) and make this determination.

If any one of the collision conditions are satisfied, then the shadowing function 278 sets the collision status of the object at state 288. The collision status is dependent on such factors as velocity and roll/pitch/yaw because the video display 162 takes these factors into account when the pieces of the explosion are displayed. The collision process 154 will also communicate the nature of the collision object to the world model in functions 222, 226.

From either state 286 or 288, the next visible object in the flight universe 164 is obtained if the test for more objects is satisfied at state 290. Otherwise, if there are no remaining airborne objects to process, the shadowing function 278 terminates at stop state 292.

Figure 8A:
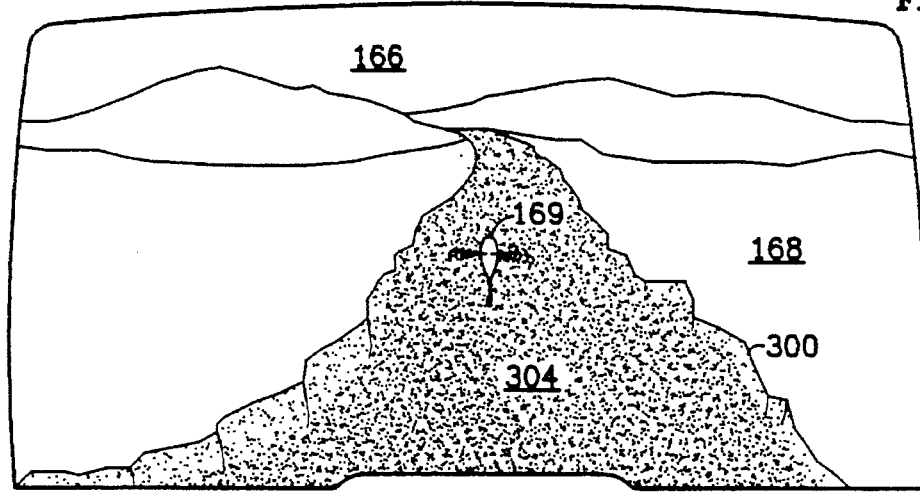
FIGS. 8a, b are a sequence of screen displays showing the approximation of atmospheric conditions aspect of the present invention.
Figure 8B:
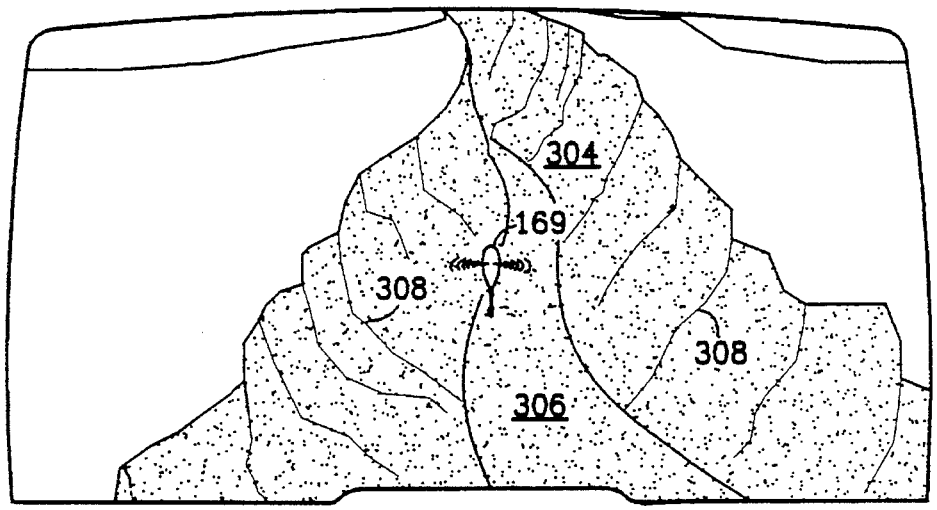

The approximation of atmospheric conditions or hazing aspect of the present invention is demonstrated in the sequence of screen displays shown in FIGS. 8a and 8b. FIG. 8a shows the helicopter 169 flying above a canyon 300 filled with a layer of haze 304. The haze 304 could be the result of fog, smoke, smog, or any other similar atmospheric condition. The sky 166 above the canyon 300 is shown to be clear.

In FIG. 8a, the haze 304 is so thick that the river 306 (FIG. 8b) at the bottom of the canyon 300 cannot even be seen. As the helicopter 169 descends into the canyon 300, as shown in FIG. 8b, the haze 304 thickens and gradually the canyon walls 308 change colors due to the optical distortion caused by particles in the air reflecting and blocking light. The layer of haze 304 is set to exist in a range of altitudes such that the river 306 becomes visible as the helicopter 169 descends. It should be understood that FIGS. 8a, b only demonstrate the effect of hazing in the vertical dimension while hazing in the horizontal dimension, though not shown, is also included in the present invention.

The haze 304 distorts colors according to the type of atmospheric condition being simulated. For instance, in the presently preferred embodiment, the following conditions and color tones are displayed in the flight universe 164 (FIG. 4): smoke—black, fog—grey, smog—reddish-brown, dusk—sky varies from orange to black and other colors are muted, and nightvision goggles—green. In addition to the color tones chosen for atmospheric conditions, it should be understood that the types of terrains also affect the overall color tone of the flight universe 164. As examples, valleys are greenish, deserts are yellowish, and canyons are reddish-brown.

In the hazing process of the present invention, sky 166 and ground 168 are treated differently from other objects in the flight universe 164. Of course, the types of atmospheric conditions or hazes available to the user 136 (FIG. 3) will be preselected by an animator. In the presently preferred arcade game embodiment of the invention, certain missions or waves will have atmospheric conditions ascribed to them and so a particular combination of mission and haze is not selectable by the user 136, although such selectivity can be easily provided. So that processing time is conserved by the computer 150 (FIG. 3), certain other assumptions of the present embodiment are that the haze 304 has a uniform consistency, and that all points of a polygon are treated as the same color even though individual points may be different distances from the viewpoint or camera position looking into the flight universe 164.

Figure 9:
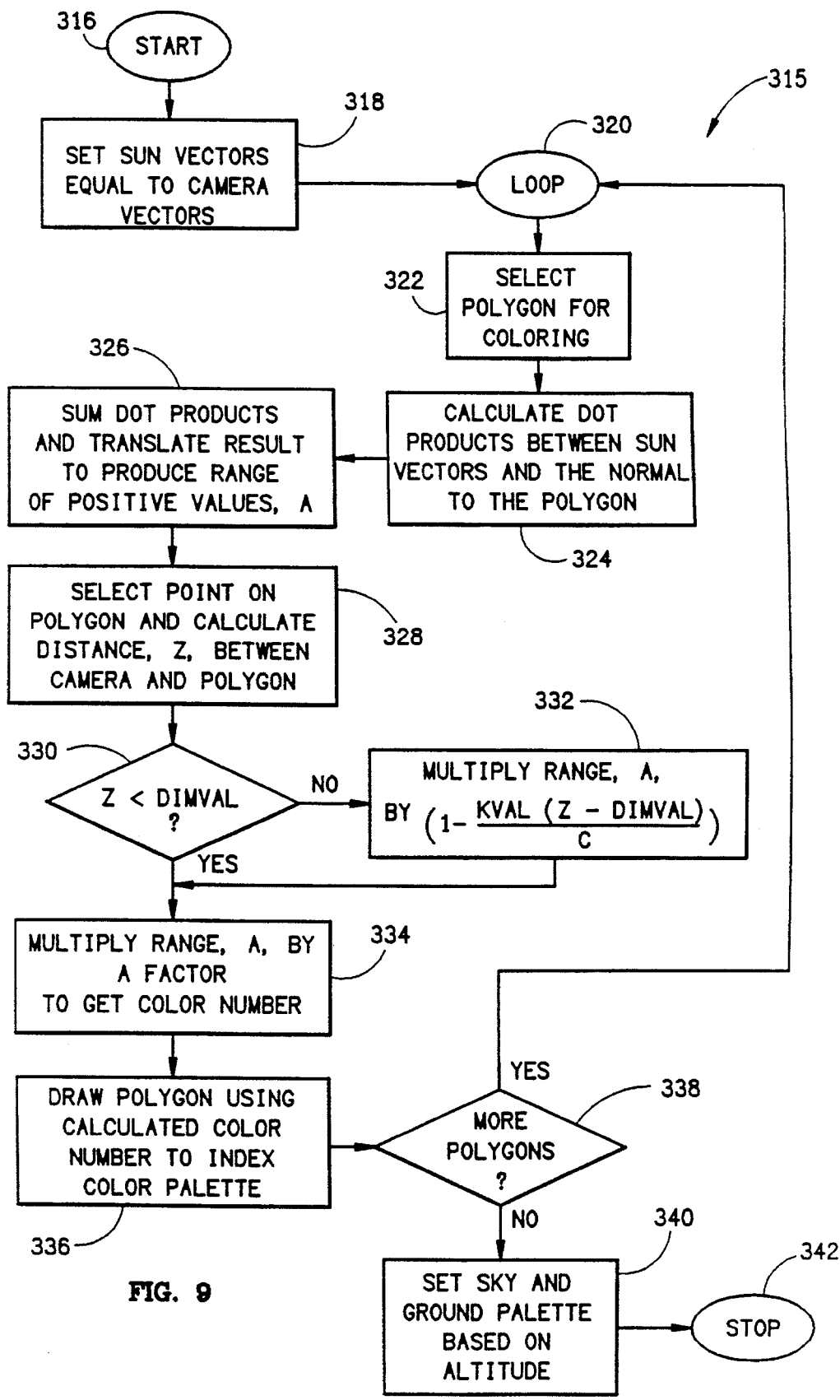
FIG. 9 is a flow diagram of the approximation of atmospheric conditions function of the present invention.

FIG. 9 shows a portion of the approximation of atmospheric conditions or hazing function 315 of the present invention. It is important to note that the hazing function 315 is not embodied in any one function in the world model 152 (FIG. 3) but instead is distributed among various states and functions of the world model 152 and video process 160. Thus, the flow diagram of FIG. 9 is only a logical representation of a collection of functions. With reference to the hazing aspect of the present invention, of particular interest to understanding the well-known function performed by the video process 160 is section 16.2 entitled "Diffuse Reflection and Ambient Light" (pp. 575–577) of the above-cited textbook by Foley and Van Dam, this section being hereby incorporated by reference.

The hazing function 315 makes the following changes to parameters, or characteristics, of the flight universe 164:

(1) sky color—a function of thickness of the haze and altitude of the helicopter;
(2) ground color—similar to sky color;
(3) horizon polygon—a preselected parameter that determines the rate of change in sky and ground colors in the horizontal direction;
(4) dimval—a preselected parameter that determines the minimum distance before the haze begins to effect colors;
(5) kval—a preselected parameter that determines how quickly colors change in haze;
(6) sun1, sun2—preselected positions and intensities of two light sources; and
(7) color palettes—preselected hues and intensities associated with each polygon that determine how colors change in haze.

The sky and ground colors are changed dynamically at the position camera state 240 (FIG. 5). The remaining above-listed parameters are set in the initialize world and user state 214. The multiple light sources, or suns (sun1 and sun2), are used to provide greater depth to the polygonal images. For instance, in the case of a single sun, if an object of uniform color faces the user and there is a corner where two faces meet, both faces would appear to have the same color and thus would appear joined in a flat plane. However, if one sun is directing 90% of the total light intensity at a first angle and the other sun is directing 10% of the total light intensity from a second angle, then one face of the object has a slightly different shade of color than the other. Resolving the issue of depth becomes especially important when there is a limited number of colors to choose from in any given palette, which will likely be the case for most common video systems.

In the preferred flight simulator, every polygon is given a color palette by an animator. In this regard, it is helpful for the animator to use a software tool that aids in the color selection process. Since the sky 166 and ground 168 (FIG. 8a) are also made up of polygons, these too are assigned initial color palettes. Presently, a sixteen color palette, ranging from color 0 to color 15, is used for each polygon. The color 0 is assigned the color of the haze, i.e., complete obscuring of the polygon, and color 15 is the natural color of the polygon up close as would be seen when illuminated by maximum direct sunlight. The colors in between are set to match the desired hazing effect. Colors 1–11, for instance, are linear steps of tint, hue and/or intensity between colors 0 and 12 and colors 12 to 14 are darker shades of color 15. The parameters kval and dimval are then chosen to reflect the thickness and type of haze.

Now again referring to FIG. 9, once the animator has completed coloring and the flight simulator 134 (FIG. 3) is activated, the hazing function 315 is entered at a start state 316. Proceeding from state 316 to state 318, the world model 152 portion of the hazing function 315 sets the sun vectors equal to the camera vectors (i.e., unit vectors indicating the direction in which the camera is pointed) if some predetermined amount of haze was called for during initialization, e.g., generally a heavy haze condition. The vector copy is necessary to force the sun to come from the user's perspective since light is assumed to scatter in all directions anyway. As first initiated by the world model 152, the remaining set of states relating to the coloring and display of polygons other than sky and ground are performed by the video process 160, which employs the ADSP and GSP.

Thus, moving to loop state 320, the hazing function 315 begins the set of states that will select colors for polygons according to the preselected thickness of haze as determined by dimval and kval. At the following state, state 322, the hazing function 315 selects a polygon for coloring. As noted previously, objects in the flight universe 164, e.g., the helicopter 169 (FIG. 8a, b), are formed from polygons. It is polygons from these objects which are selected for coloring.

After the hazing function 315 transitions to state 322, the color of the selected polygon is determined by performing the dot products of the sun vectors, $S_1=(x_1,y_1,z_1)$, and the normal, $N=(x,y,z)$, to the polygonal plane. Each dot product is a scaler having a magnitude depending on the angle subtended between the two vectors and the magnitude of the sun vector. Thus, if two vectors are perpendicular their dot product will be zero indicating one-half intensity of the polygon color as seen through the haze. On the other hand, if the two vectors point towards one another such that maximum sunlight is received on the polygonal plane, (i.e., $S_i=-N$), the predetermined natural color of the polygon will be seen by the observer, e.g., color 15.

Now moving to state 326, the hazing function 315 sums the components of the dot products (in the present embodiment there are two dot products since there are two suns, sun1 and sun2). Then a translation factor is added to the sum to produce a range of positive values called A=(0,M) where M is the worst case sum of the dot products after scaling. In general, each sun vector has a magnitude (intensity) that is equal to 1.0 so that, assuming that the suns are pointing in the same direction, the maximum possible range before scaling is (−2.0,2.0). After scaling, the range A will be (0,4.0). If the sun vectors $S_i$ have a different magnitude than 1.0, the range is scaled so that the magnitude of A will always be (0,4.0).

After calculating the range A at state 326, the hazing function 315 moves to state 328 wherein the function 315 calculates the distance, z, between the camera and the selected polygon. The farthest vertex of the polygon is chosen as the polygon reference point for the distance z, but any point on the polygon could be chosen. Then, at decision state 330 the function 315 compares z and dimval. If z is not less than dimval then the range A is modified by reducing it based on the distance the polygon is from the camera as follows:

$$A=A'\times(1-kval\times(z-dimval)/C) \qquad (1)$$

where
A is the new range;
A' is the old range;
kval is a predefined constant;
z is the distance between the camera position and polygon;
dimval is a predefined constant; and
C is a constant.

In a floating point application of the hazing function 315, C is preferably set to 1.0. When kval is an integer, however, C is chosen so as to provide a sufficient range to cover the entire color palette ascribed to the polygon.

If z<dimval at decision state 330, then the hazing function proceeds to state 334. At state 334, arrived at from either of states 330 or 332, the range A is divided by the number of colors in the palette. For example, in the presently preferred embodiment sixteen colors are used per palette. Hence, to efficiently divide the range A, each number is first multiplied by four, and then truncated to the next lower number. Thereafter, the video process 160 (FIG. 3), employing the GSP, draws the polygon of the selected color on the video display 162 as shown at state 336 using the color number calculated at state 334 by the ADSP (i.e., the upper end of the range A). Next, the ADSP determines whether there are more object polygons to color and display at state 338. If there are more polygons, then the hazing function 315 continues by moving to loop state 320. Otherwise, if all object polygons have been drawn, then the function 315 proceeds to state 340.

At state 340, after a frame change initiated by the GSP, the world model 152 sets the color palettes for the sky 166 and the ground 168 (FIG. 8a). For instance, the colors of the sky 166 are chosen such that the sky is the color of the haze, e.g., gray for fog at ground level, and blue when the helicopter 169 has risen above the haze. Similarly for the ground 168, the color palette is changed according to the altitude of the helicopter 169.

Although the following discussion refers to the coloring of the ground 168, it should be understood that a similar procedure is applied to change the color palette of the sky 166.

The ground 168 (FIG. 8a) consists of many polygons, each corresponding to a given distance from the camera. As the camera (along with the helicopter 169) altitude increases the colors change so that it appears that the ground 168 is disappearing into the fog, smoke, etc. The opposite is true as the helicopter 169 descends (FIG. 8b). That is, the ground 168 gradually appears out of the haze. For ground colors a set of fifteen colors are presently preferred ranging between colors 0 and 14 as follows: color 14—the color of a polygon beyond the range of maximum visibility and color 0—the color of a polygon without any atmospheric discoloration. In one embodiment, maximum visibility is assumed to be 1400 feet. Also, the horizon is segmented into fifteen polygons. The larger the number of colors and polygons the better the approximation. However, as these numbers increase, the computation becomes more complex.

Now as an example, each polygon is spaced 100 ft. apart with polygon 0 being 0 ft. from a camera located at the lowest point of the ground 168 and polygon 14 being 1400 ft. from the same camera position. Then assume that the camera has risen in altitude to 235 feet. Thus, polygon 0 is 235' ft. from the camera, polygon 1 is 335 ft. from the camera, and so on. To determine the color for any polygon, polygon 0, for example, the hazing function 315 takes the distance between the polygon and the camera, 235 ft., and linearly interpolates between the colors of the original range. For example, to set the colors of the color palette associated with the ground 168, polygon 0, the color of polygon 2 and the color of polygon 3 are taken and a linear interpolation is made to arrive at a color 35/100 between the two colors. Any distances greater than the visibility are the same as color 14.

Changing the maximum visibility means that the distances between the polygons are different. For example, if the visibility is less than 1400 ft. then the distance between polygons is reduced. Furthermore, presently the distances between polygons is the same. However, varying distances between polygons are conceivable using the same types of calculations just described, although more computations would be required to process such a scheme.

Thus, the visual cue aspects of the present invention, terrain following shadows and hazing, have been described. The discussion below relates to the modeling aspects of the present invention, including user selectable zoom, horizontal and vertical ground avoidance, and autorotation modeling.

Figure 10A:
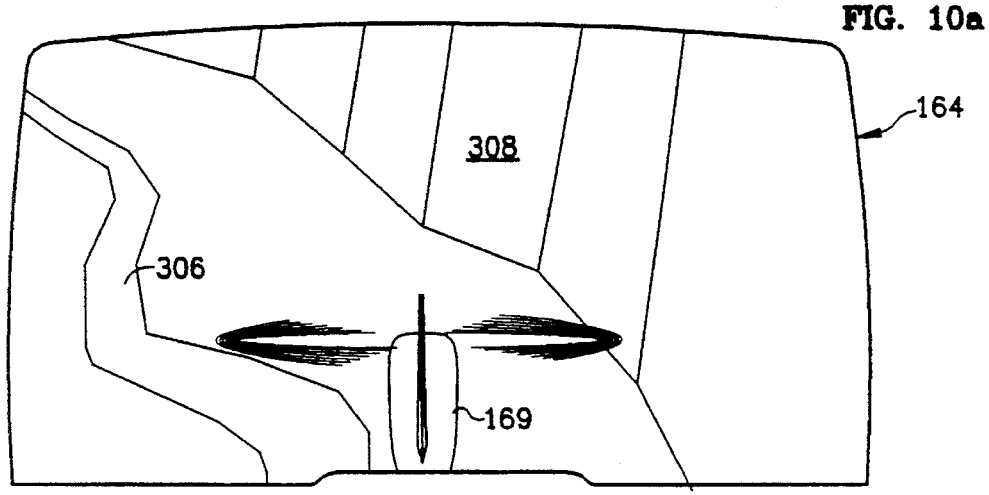
FIGS. 10a, b, c are a sequence of screen displays showing the user selectable zoom aspect of the present invention.
Figure 10B:
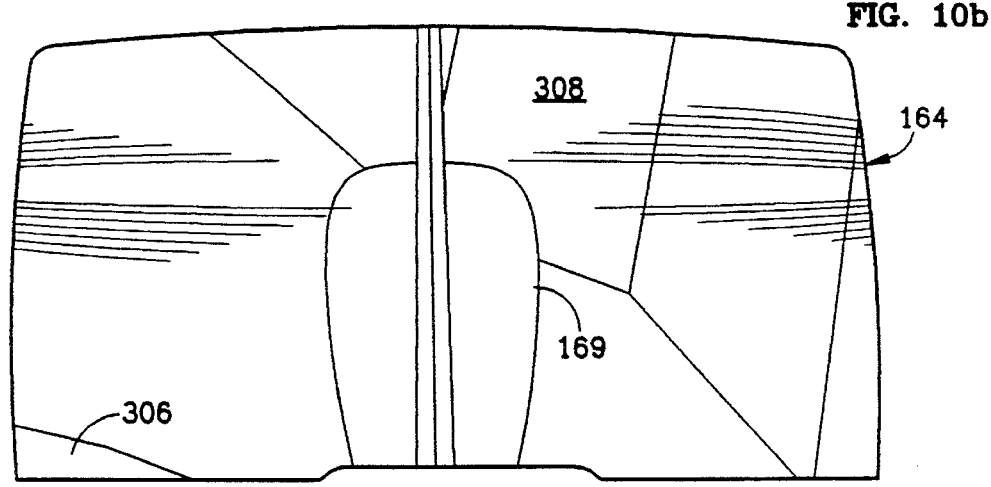
Figure 10C:
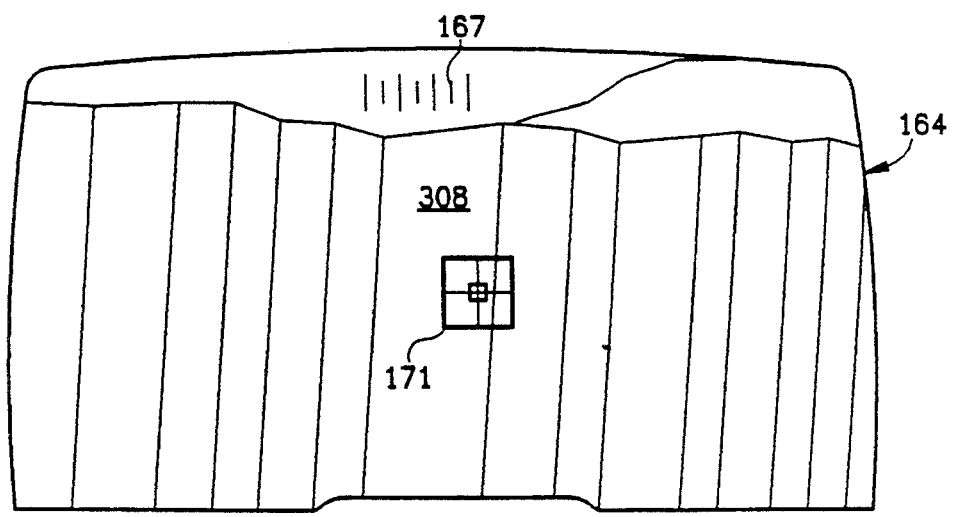

FIGS. 10a, b, c are a sequence of screen displays illustrating the operation of the user selectable zoom portion of the present invention. FIG. 10a shows the flight universe 164 as seen from a third person perspective. FIG. 10c shows the flight universe 164 as seen from a first person perspective. FIG. 10b shows the flight universe 164 as seen from a perspective that is intermediate between the perspectives shown in FIGS. 10a and 10c.

First and third person perspectives are the two selected viewing angles for the user selectable zoom function of the present invention which may be entered by pushing the zoom button 146 (FIG. 3). The third person perspective, as presently preferred, positions the camera behind the helicopter 169 approximately 250 feet and 18 degrees of negative pitch, i.e., above the helicopter 169. The distance is selected to maximize the view without interfering with the view of the helicopter motion, i.e., if the camera is too far behind then other objects may interfere with the view of the helicopter 169. The pitch angle is selected so as to display the majority of the horizon, the ground underneath the helicopter 169 and the shadow 270 (FIGS. 6a, b, c). The two perspectives provide flexibility for different types of users and, in addition, under certain circumstances, it may be beneficial to shift from simulating flying (first person) to a third person view.

In first person perspective, the user 136 (FIG. 3) is provided a camera position that duplicates the exact roll/pitch/yaw of the helicopter 169. Thus, the view is what a pilot would see looking straight out of the helicopter cabin adjusted by a pitch angle that is three-quarters of the way up between the pitch of the helicopter nose and the horizon. This increase in pitch is to provide the user 136 with a maximum viewing angle for targets that are likely to be seen but still maintains the sense by the user 136 that the helicopter 169 is pitched down.

There is also some compensation in the yaw in first person for the case when the reticle 171 (FIG. 4) has locked onto a target. In this case the user 136 has a target in mind and will turn his head somewhat as he is flying by the target or the target is flying by the helicopter 169. Thus, the yaw of the view will be somewhat different from the yaw of the helicopter 169.

Also, for large roll angles, e.g., 60 degrees, which represent steeply banked turns, the camera yaw is positioned to point towards the turn. This is so that the user 136, rather than looking where the nose is pointed, is looking towards the new heading of the helicopter 169. Thus, the camera is actually yawed some amount to look towards the horizon and, if the user 136 picks a landmark on the horizon coming out of a steep turn, the helicopter 169 will fly towards the landmark at the end of the turn.

Now, referring specifically to the drawings, FIG. 10a is a screen display showing the helicopter 169 from the third person perspective of the flight universe 164, before the zoom button 146 (FIG. 3) has been pushed. In this view, the helicopter 169 is proceeding through the canyon 300 (FIGS. 8a, b) and the river 306 can be seen at the lower left of the view. One of the canyon walls 308 can be seen looking straight ahead.

FIG. 10b is another third person view that is displayed by the flight simulator 134 after the zoom button 146 has been pushed. The helicopter 169 has proportionately increased in size and can no longer be completely seen as the camera moves towards the helicopter 169. The river 306 has also increased in size but only a small part of it can be seen in FIG. 10b. The canyon wall 308 has also come closer into view.

Lastly, FIG. 10c shows a first person perspective of the flight universe 164 which is seen at the end of the user selectable zoom function which was initiated by pressing the zoom button 146. The canyon wall 308 is in the foreground and the heads up display comprising the compass 167 and the reticle 171 are shown in FIG. 10c. If desired, the direction of the zoom can be reversed during or at the end of the zoom function, by again pressing the zoom button 146, thus, for example, displaying the perspectives of FIG. 10 in the reverse order from that described.

Figure 11A:
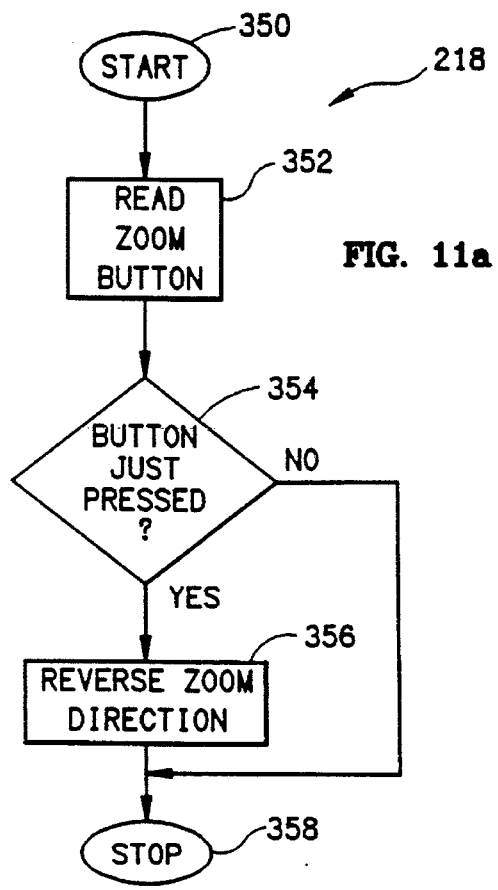
FIGS. 11a, b are flow diagrams of the user selectable zoom function of the present invention.

Turning to the discussion of the specific operation of the user selectable zoom, FIG. 11a illustrates the flow diagram for the read zoom switch portion of the read controls and switches function 218 of the world model 152 (FIG. 3) shown in FIG. 5. Entering at start state 350, the function 218 next reads the zoom button 146 at state 352 and stores this status in the memory of the world model 152. Moving to decision state 354, if the zoom button 146 was just pressed by the user 136 then the zoom direction, a state held in the memory of the world model 152, is reversed. From decision state 354, if the zoom button 146 was not just pressed, or after the completion of state 356, the function 218 terminates at a stop state 358.

Figure 11B:
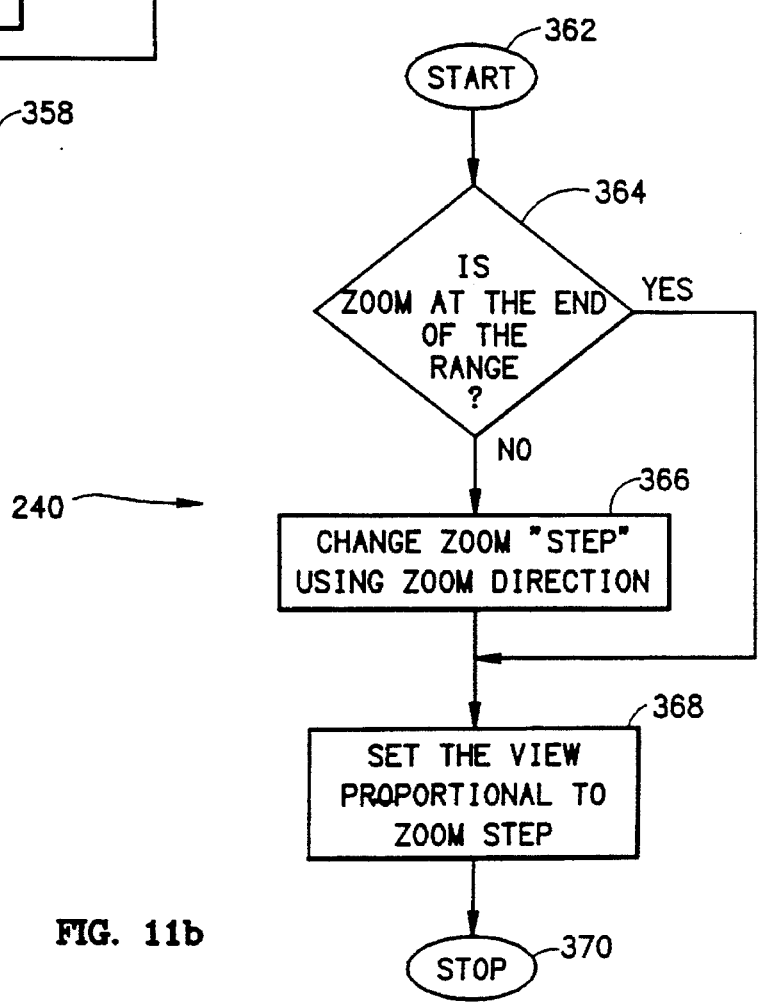

FIG. 11b is a portion of the flow diagram for the position camera function 240 of the world model 152 shown in FIG. 5. After the function 240 is entered at start state 362 (due to zoom being active as determined by the function 218), the function 240 moves to the decision state 364 to test whether the zoom is at the end of the zoom range. If the user 136 is presently in one perspective view it takes a number of discrete steps to reach the other perspective. In the present embodiment, the number of discrete steps is equal to sixteen. Presently this time interval amounts to about one second of continuous movement from one perspective into the other perspective. The end of the range is simply the last step in the zoom sequence, i.e., if zooming in to first person, the end of the range is the view all the way in, and if zooming out to third person, the end of the range is the view all the way out.

If the zoom is not at the end of the range, the zoom step is changed according to the current zoom direction at state 366. That is, if the zoom direction is "in" towards first person then step=step—1 but if zoom is "out" towards third person then step=step+1. Then the view, proportional to the zoom step, is set at state 368. For example, in the third person perspective, the camera has no roll. The yaw matches the yaw used in the first person perspective. If, for instance, the helicopter 169 were flying backwards the camera would still point forwards.

In the change of views the position camera function 240 tries to match the roll, pitch and yaw angles. If the function 240 is stepping N times then the proportional change for roll at each step is as follows:

$$\text{roll}=\text{roll}_{in}+\text{step}/N(\text{roll}_{out}-\text{roll}_{in}) \qquad (2)$$

where
roll is the calculated roll at the current step;
$\text{roll}_{in}$ is the roll when zoomed in;

step is the current step in the zoom sequence;
N is the number of steps in the zoom sequence; and
$\text{roll}_{out}$ is the roll when zoomed out.

For example, if the helicopter 169 is in a steep bank, the third person perspective will have no roll whatsoever whereas the first person perspective has a noticeable roll. Thus, the angle of the camera is continuously rolled into the angle of the helicopter 169 in going from third to first persons. By the last step, the camera is at the correct roll angle. The yaw angle remains the same, yawing in the direction that the helicopter 169 is pointed. The pitch angle goes from 18 degrees above the helicopter 169 and flattens out to 0 degrees when the first person view is inside the helicopter 169.

The user selectable zoom is active at any time while the helicopter 169 is flying. There are two current exceptions to this rule. The first exception is when the helicopter 169 crashes into a hill, cliff, etc., when the world model 152 will always zoom out to third person to show the explosion pieces (previously discussed). The zoom to third person is initiated in this case since the "pilot" is no longer "inside" the helicopter 169. The second exception is restarting after a crash against a cliff. The restart perspective will always be third person and the helicopter 169 will be positioned about 50 feet off the side of the cliff to get the right beginning perspective.

Another unique modeling feature of the present invention is collision or ground avoidance which consists of horizontal and vertical aspects. First, the discussion will address horizontal ground avoidance.

In the present arcade game embodiment of the invention, the arcade game allows the user/player 136 to crash into hills and watch what happens thereby providing a further degree of entertainment value to the users. In this way there is reinforcement to the user 136 that part of the skill of flying a helicopter is to not crash into things like hills.

On the other hand, other airborne objects, including enemy helicopters, fly as if piloted and, for example, will automatically pull up on their own collective and increase pitch to avoid a hill. This maneuver reduces the airspeed of the helicopter as would actually occur in a helicopter performing this type of maneuver. The hill is detected by projecting a flight path up to some limited distance after N seconds of flight, 1500 feet in the case of a helicopter, for example. Once the object has been avoided and there are no more ground obstructions in front, the airborne object drops its nose down and tries to follow the terrain again.

Figure 12A:
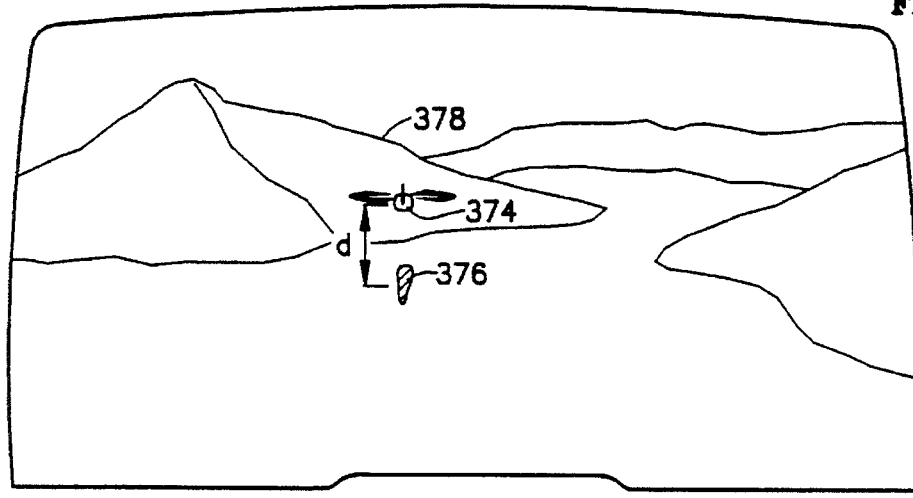
FIGS. 12a, b are a sequence of screen displays showing the horizontal ground avoidance aspect of the present invention.
Figure 12B:
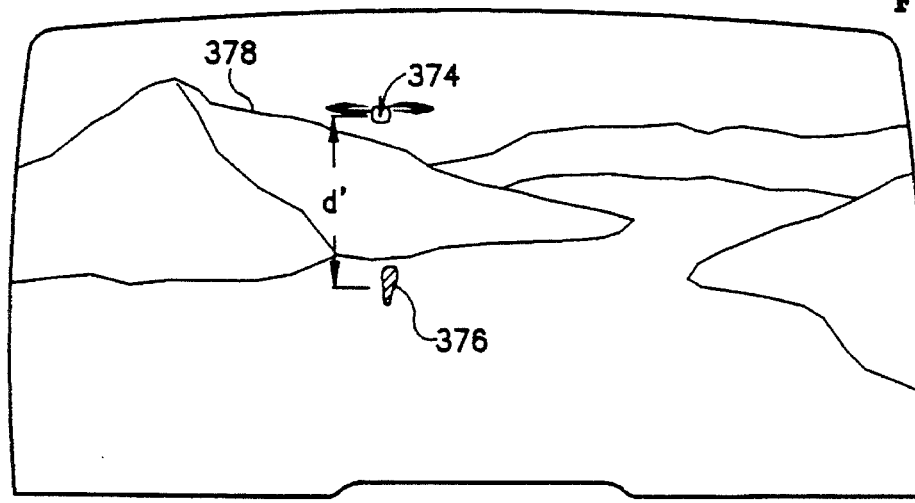

Referring to the drawings, FIG. 12a shows an enemy helicopter 374, and its shadow 376, approaching a hill 378. In FIG. 12b, the world model 152 has pulled up on the collective of the enemy helicopter 374 so as to avoid crashing into the hillside 378.

Figure 13A:
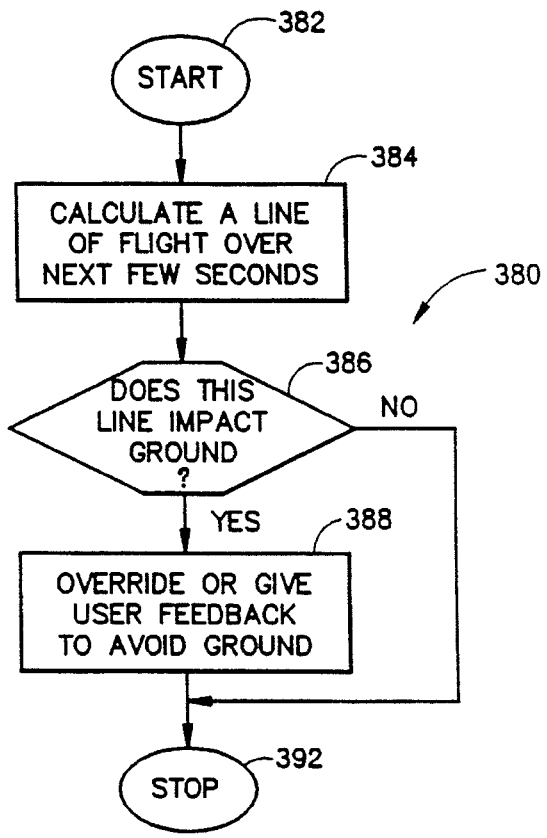
FIGS. 13a, b are flow diagrams of the horizontal ground avoidance function of the present invention.

Horizontal ground avoidance is initiated in the world model 152 by the start collision process 154 for next frame state 246 in FIG. 5. As shown in FIG. 13a, the enemy movement function 228 and check for ground collisions function 224 (FIG. 5) uses the horizontal ground avoidance function 380 which begins at start state 382 and continues in the collision process 154 by calculating a line of flight for an object over the next N seconds at state 384. Moving to decision state 386, the collision process 154 tests whether the flight path intersects the ground 168, e.g., the hill 378 in FIG. 12a. At this point the results of the collision process 154 are forwarded to the world model 152 as part of function 380. If the projected line of flight does impact the ground 168 then either the controls of the aircraft are overridden or the user is given feedback to avoid the ground at a function 388. From either state 388, or decision state 386 wherein it was determined that there would be no impact, the function 380 terminates at stop state 392.

Figure 13B:
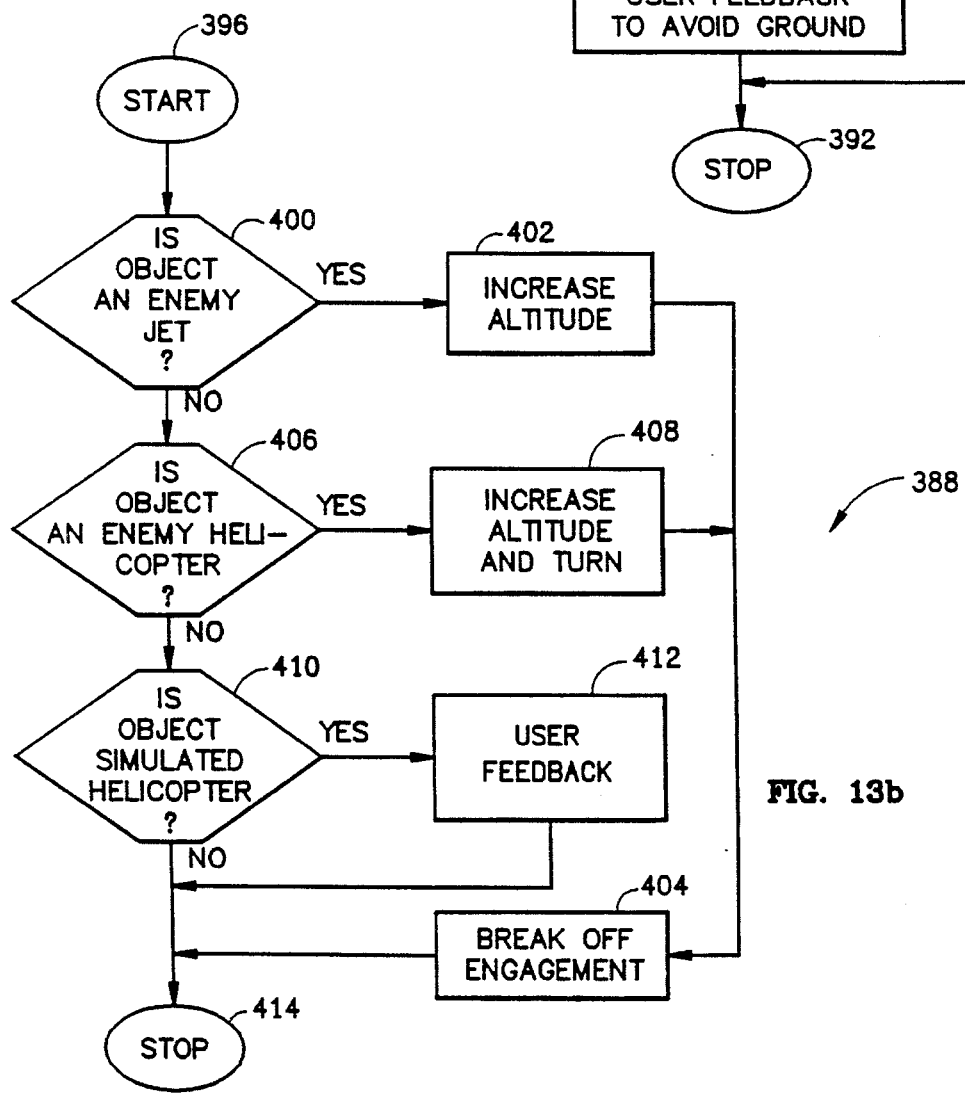

The details of the override function 388 are presented in FIG. 13b. There, the override function 388 enters the flow at start state 396 and proceeds to decision state 400 to test whether the object is an enemy jet. If the object is an enemy jet then the function 388 increases the altitude of the jet at state 402 and breaks off any engagement it may be in at state 404. Returning to decision state 400, if the object is not an enemy jet then the function 388 continues to another decision state 406 to test whether the object is an enemy helicopter. If the object is an enemy helicopter, e.g., the helicopter 374 of FIGS. 12a, b, then the helicopter increases altitude and/or turns if necessary as indicated at state 408. The turn maneuver may be necessary where the helicopter is approaching a cliff, for example. Similarly, the helicopter breaks off any engagement as the function 388 moves to state 404. Now if at decision state 406 it was determined that the object was not an enemy helicopter, the function 388 proceeds to a decision state 410 to test whether the object is the simulated helicopter 169. If the test is successful, then the user 136 is given feedback indicating that an impact is imminent, at state 412. From state 404, or if the object is not the user's helicopter 169 as indicated by the failure of the test at state 410, or after completing the user feedback at state 412, the override function 388 terminates at stop state 414.

Figure 14A:
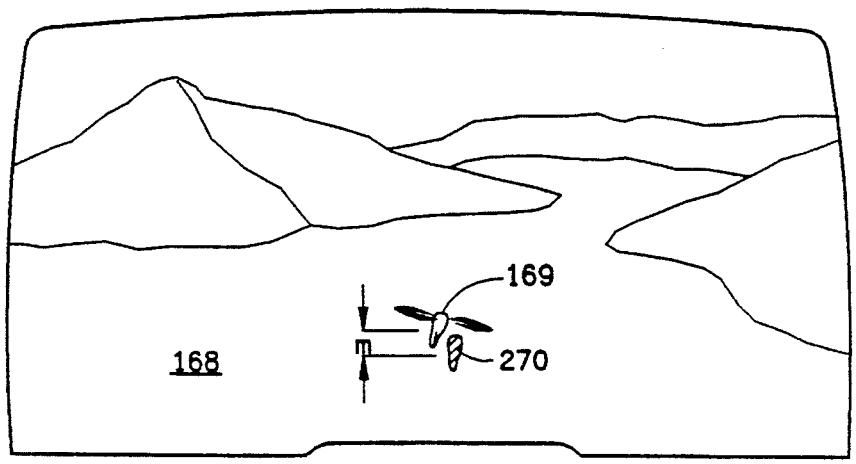
FIGS. 14a, b are a sequence of screen displays showing the vertical ground avoidance aspect of the present invention.
Figure 14B:
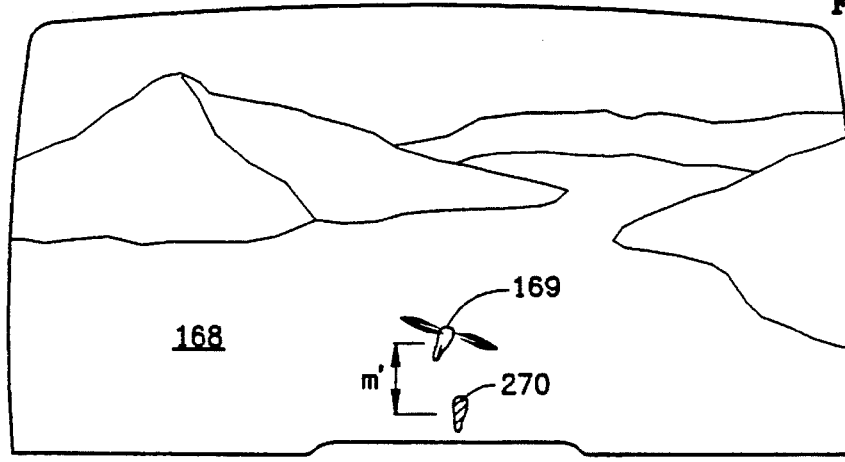

The present invention also models vertical ground avoidance for the simulated helicopter 169 as shown, for example, in FIGS. 14a and 14b. For vertical ground avoidance by a helicopter, a particular maneuver is to drop the collective so as to basically drop vertically. Thus, if the world model 152 (FIG. 3) detects that the helicopter 169 is going to impact the ground, the world model 152 artificially pulls up (there is no actual feedback movement) on the collective 138 (FIG. 3), thus overriding its current setting. For users who are just becoming initiated to helicopters, this feature prevents frequent crashes and therefore promotes further enjoyment/benefit from the arcade game/flight simulator 134.

In addition, on a related theme, the world model 152 limits the helicopter 169 from climbing above a predetermined altitude, for example, 300 feet. When this limit is reached the collective 138 (FIG. 3) is artificially dropped to reduce any further increase in altitude.

Returning to the discussion of vertical ground avoidance, if the user 136 pushes the nose of the helicopter 152 down with the cyclic 142 (pitches), rolls using the cyclic 142, or yaws by pushing the tail rotor pedals 140, the world process 152 assumes that the user 136 does not want to land. In other words, if the controls 140, 142 are not centered, then the helicopter 169 will not land but instead will keep the helicopter 169 at a minimum safe altitude. For instance, since the rotor of the helicopter 169 is about 24 feet in diameter, the helicopter 169 is maintained at an altitude of about 30 feet so as to avoid impacting the ground 168 with the rotor. Thirty feet is the normal cruising altitude of combat helicopters anyway since treetop height is typically about that.

If a user approaches a hill, the user has one of three options presently available: slow down and let the flight simulator 134 fly the helicopter 169 over the hill, pull up on the collective 138 to fly over the hill, or turn to avoid the hill. Basically, to automatically avoid the ground 168 in the vertical direction, the flight simulator 134 looks at the vertical velocity of the helicopter 169 and then determines where the ground 168 is by using the collision process 154 (FIG. 3).

Referring again to FIG. 14a, the helicopter 169 is shown flying at a critical distance, m, away from the ground 168. The helicopter 169 is also in a roll, i.e., the cyclic 142 is turned, indicating that the user 136 does not want to land. Hence, the flight simulator 134 pulls up (artificially) on the collective 138 to achieve a new minimum distance from the ground 168, m'.

Figure 15:
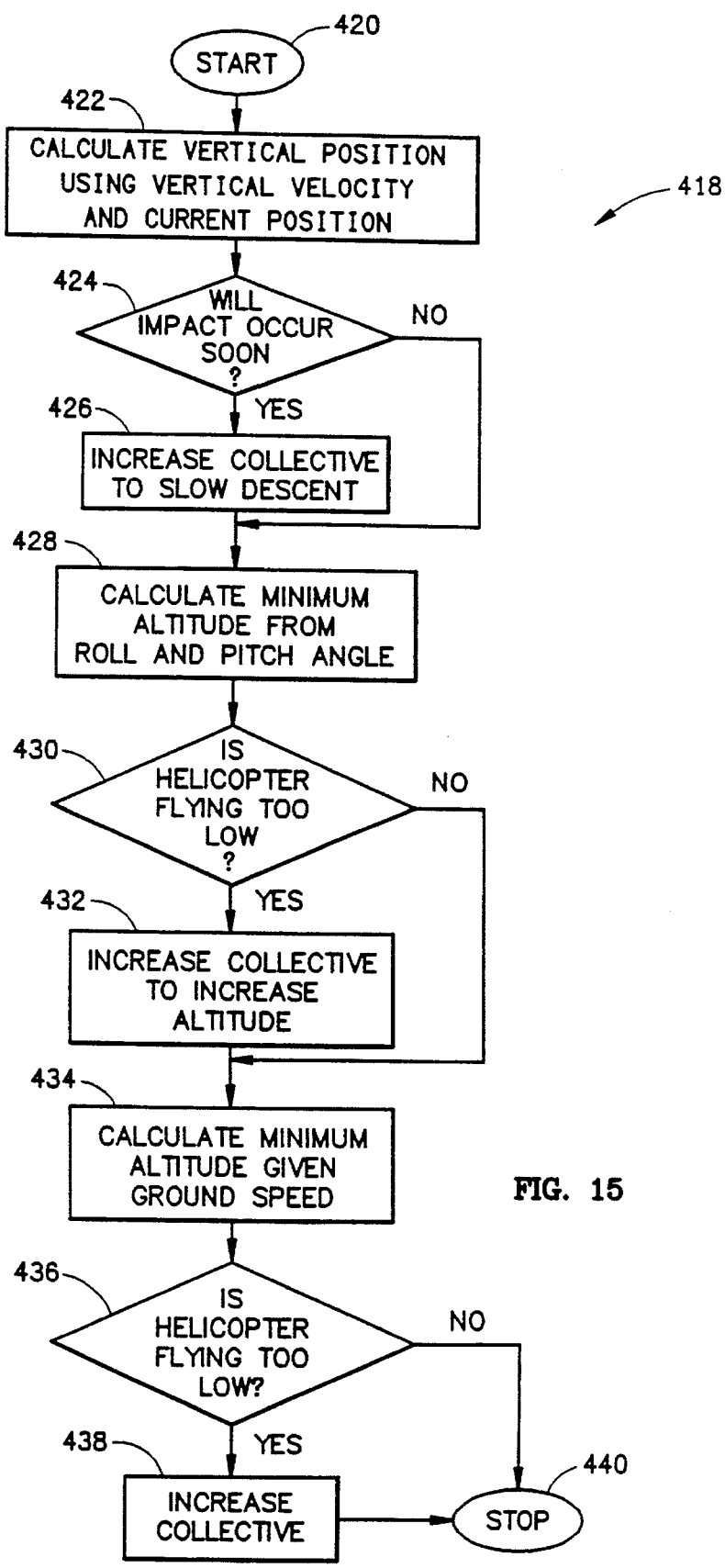
FIG. 15 is a flow diagram of the vertical ground avoidance function of the present invention.

The world model 152 gets the user(s) position(s) at the function 220 as already described with reference to FIG. 5. The function 220 makes use of a vertical ground avoidance function 418 as shown in flow diagram form in FIG. 15. The vertical ground avoidance function 418 enters the flow at start state 420. From state 420, the ground avoidance function 418 moves to state 422 to calculate a new vertical position of the helicopter 169 (FIG. 14a) using its vertical velocity and current position. Proceeding to decision state 424, the function 418 uses the terrain shadowing information received from the collision process 154 during the last display cycle (FIG. 5). (In an actual helicopter 100, the ground distance could be obtained by using a relative altimeter.) If impact appears imminent then, after transitioning to state 426, the avoidance function 418 artificially increases "movement" on the collective 138 thereby increasing the lift and slowing the descent of the helicopter 169.

From state 426, or state 424 if impact does not appear imminent due to vertical velocity, the avoidance function 418 moves to state 428 to calculate a minimum altitude based on the roll and pitch angles of the helicopter 169 (from the position of the cyclic 142) and the distance to the ground 168. (Although not shown, the yaw speed based on the position of the rudder 140 is used to maintain altitude.) Then, moving to decision state 430, the avoidance function 418 compares this minimum altitude to the current altitude of the helicopter 169 (e.g., the distance m shown in FIG. 14a). If the helicopter is flying too low (the case of FIG. 14a) then the collective 138 is artificially increased to increase the altitude of the helicopter 169 (the case of FIG. 14b) at state 432.

From state 432, or decision state 430 if the helicopter is not flying too low based on roll and pitch angles (and yaw speed), the vertical ground avoidance function 418 moves to state 434 to calculate the minimum altitude given the ground speed. This minimum altitude is then compared with a preselected minimum altitude given a preselected ground speed at decision state 436. This test is made because the rotor of the helicopter 169 will be tilted forward for forward thrust and the rotor should not impact the ground 168. Hence, moving to state 438, if the helicopter 169 is too low, the ground avoidance function 418 artificially increases the collective 138. Lastly, the vertical ground avoidance function 418 terminates at stop state 440 after moving from state 438, or state 436 if the helicopter 169 was not flying too low.

Figure 16:
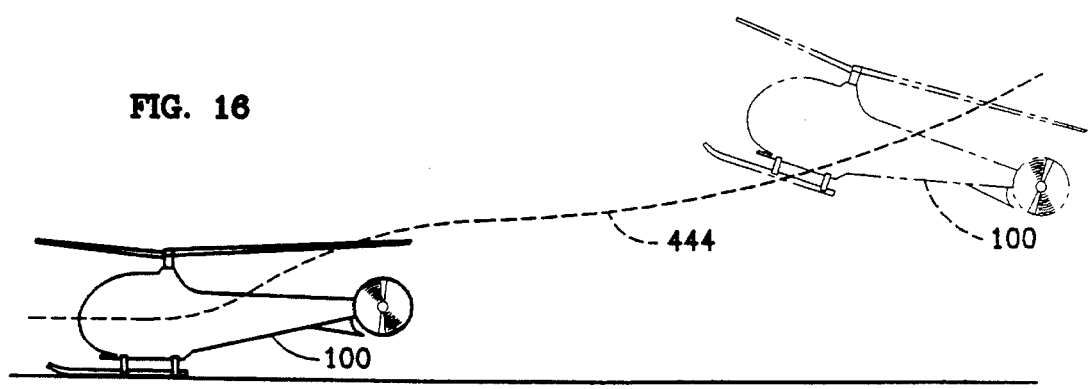
FIG. 16 is a diagram showing an autorotation flight pattern.

Another modeling feature included in the present invention is the emergency procedure used by helicopter pilots when the main rotor 102 (FIG. 1) has lost power. FIG. 16 diagrammatically demonstrates the flight path taken by a helicopter 100 which has performed an autorotative landing. Assuming that a helicopter has lost power, the pilot will increase forward speed and drop the collective 122 (FIG. 2) so that airflow is maintained through the rotor blades 104 thereby maintaining rotor velocity. Now, the helicopter 100 (shown in phantom) begins the final stage of flaring in the autorotative landing. In the final stage of flaring, the pilot pulls back on the cyclic 120 (FIG. 2) thereby decreasing the velocity of the main rotor 102 and increasing the angle of attack of the rotor blades, thus increasing lift and slowing the descent of the helicopter 100. The helicopter 100 will come to a soft landing if the pilot properly pulls up on the collective 122 so as to expend the remaining inertia in the rotor 102 (slowing the rotor velocity), but at the same time increasing lift as desired.

FIG. 17 illustrates a typical height-velocity diagram associated with a helicopter. Certain combinations of altitude and airspeed, indicated at 446a and 446b allow a helicopter to safely land using the autorotation maneuver. For example, the combination 446a shows that if the helicopter is hovering but high enough and power is lost, the helicopter can safely land because the nose can be tilted forward so that the helicopter falls forward and increases velocity. On the other hand, as shown by the combination 446b, if the helicopter's airspeed is high enough at low altitude, then when power is lost the helicopter can still gain some altitude before the collective has to be dropped. However, if the helicopter does not satisfy either of the combinations 446a, b, i.e., the helicopter is too low and not traveling fast enough, the helicopter cannot flare and will likely not come to a safe landing.

Figure 18A:
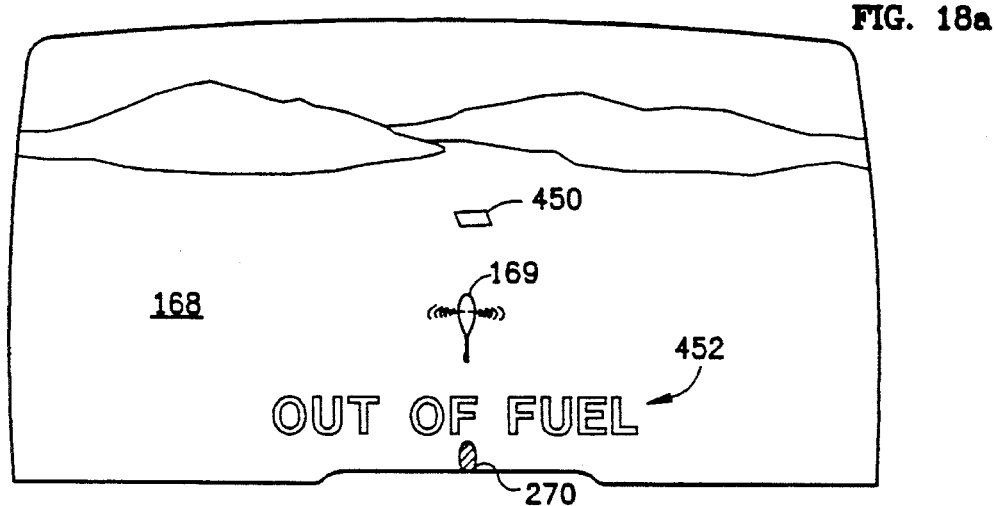
FIGS. 18a, b, c are a sequence of screen displays showing the autorotation aspect of the present invention.
Figure 18B:
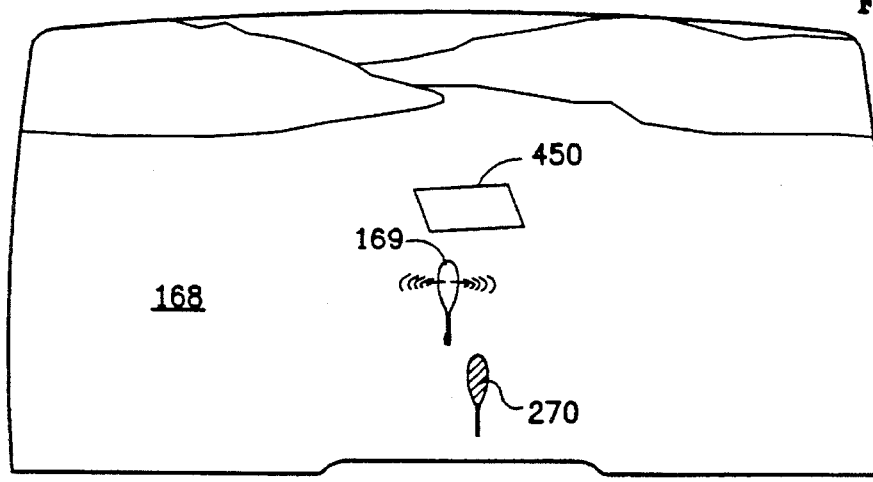
Figure 18C:
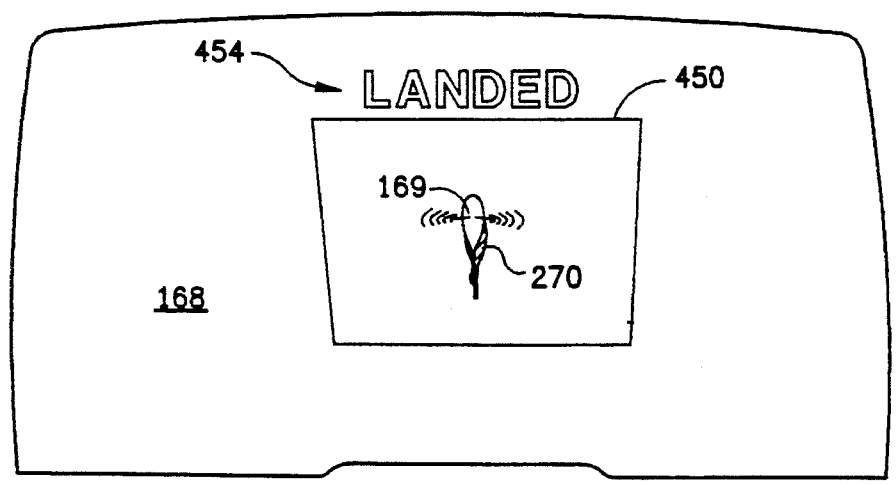

With reference to FIGS. 18a, b, c, the autorotation modeling is shown diagrammatically via a sequence of screen displays. In FIG. 18a, the helicopter 169 is shown heading for a landing pad 450. In this sequence, the helicopter 169 is assumed to be out of fuel so the flight simulator 134 causes the "OUT OF FUEL" message 452 to appear on the video display 162. The user 136 must then control the helicopter 169 to avoid colliding with the ground 168, if possible. FIGS. 18b and 18c illustrate a successful landing of the helicopter 169 on the landing pad 450 using the autorotation flare maneuver.

Figure 19:
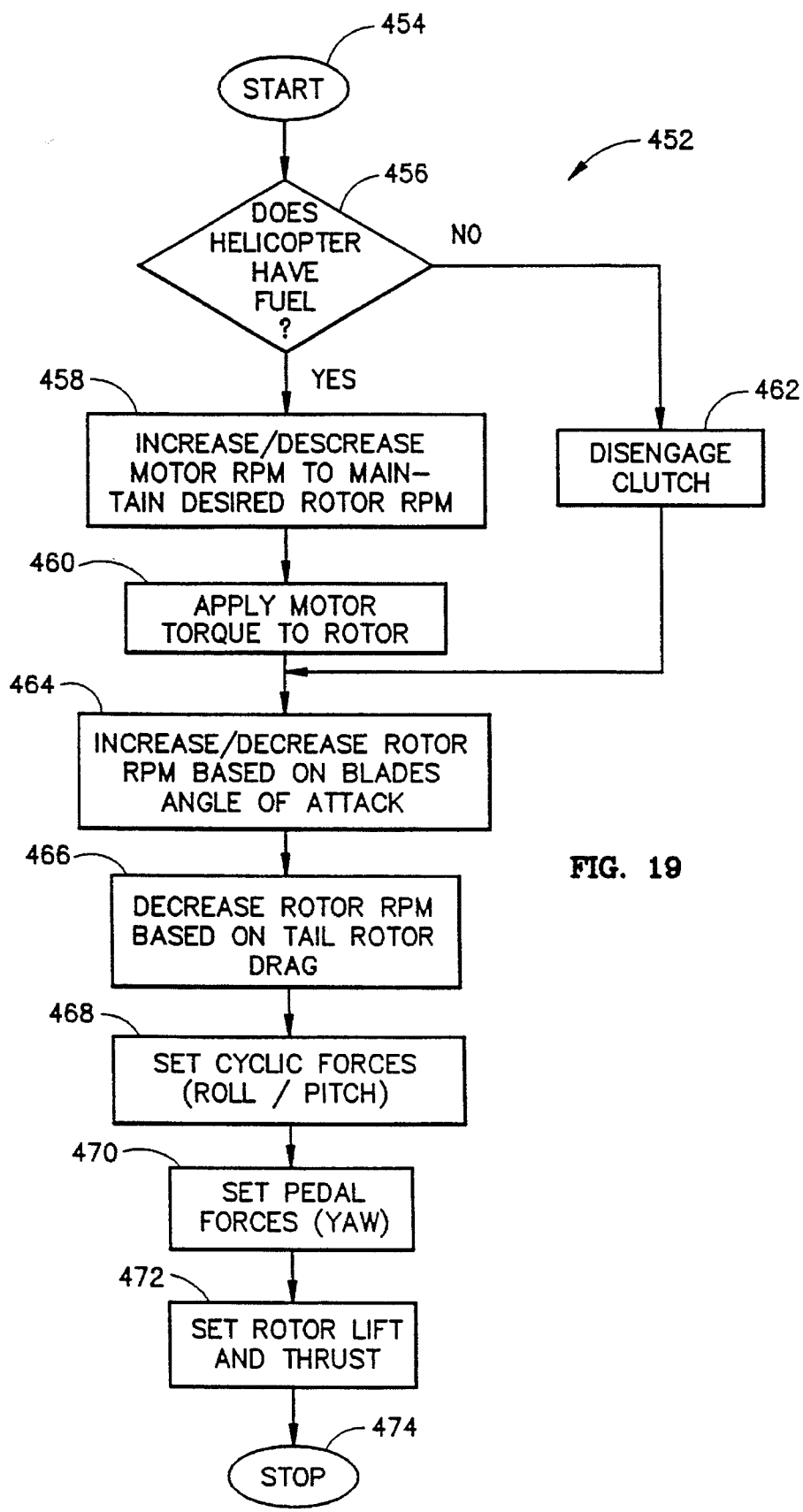
FIG. 19 is a flow diagram showing the autorotation function of the present invention.

Now referring to FIG. 19, the control flow for the autorotation function is generally indicated by reference numeral 452. The autorotation function 452 is a part of the world model 152 (FIG. 5), more specifically located in the get new positions function 220 of FIG. 5. After entering the control flow at start state 454, the autorotation function 452 moves to decision state 456 to determine whether the helicopter 169 still has fuel. If there is still fuel left, then the function 453 proceeds to state 458 to increase or decrease the motor velocity to maintain the desired rotor velocity, and then to state 460 to apply the torque of the engine to the rotor. In the present embodiment, the rotor velocity is set at 300 rpm, for example, after gearing (the engine velocity is typically several thousand rpm). In attack helicopters the engine velocity is varied automatically to achieve the desired rotor velocity. Now if, at state 456, the autorotation function 452 determines that the helicopter 169 does not have fuel, then the function 452 proceeds to state 462 to disengage the clutch so that the engine has no further effect on the rotor velocity.

Now moving to state 464 from the state 462, or state 460 if the helicopter 169 still has fuel, the rotor velocity is increased or decreased according to the angle of attack maintained by the rotor blades. An increase in rotor velocity will occur if a "wind" comes up through the rotor blades and the blades have a desired angle of attack. In other words, if the collective 138 is dropped and the helicopter 169 is falling (increased wind) then the rotor velocity is increased.

Next, moving to state 466, the rotor velocity is decreased if the rudder 140 is being manipulated (i.e., off-center) since the tail rotor is driven by the same mechanism as the main rotor changes in the tail rotor thereby place a drag on the main rotor. Moving from state 466 to state 468, the autorotation function 452 introduces the effect of a decreased rotor velocity onto the cyclic (controlling roll and pitch). That is, the pilot loses control of roll and pitch as the rotor decreases.

For example, as presently implemented, any change from nominal rotor velocity (around 300 rpm) causes lift and thrust to be reduced. Similarly, moving to state 470, the yaw of the helicopter 169 is less affected by the user 136 manipulating the rudder pedals 140. Lastly, the autorotation function 452 transitions to state 472 to set the lift and thrust based on the new rotor velocity. As the rotor velocity decreases the helicopter 169 will generally lose lift. However, decreased lift will be somewhat compensated if there is an airspeed that causes an increased thrust, i.e., the faster the helicopter 169 flies forward, the less the required angle of attack.

Thus, as has been shown and described, the present invention, whether embodied as a flight simulator, entertainment software or arcade game, has important advantages over the present technology. More specifically, the visual cues of terrain following shadows and hazing and modeling features of a user selectable zoom, horizontal and vertical ground avoidance, and autorotation, are uniquely defined by the present invention so as to be accomplished by inexpensive computer hardware. In addition, the terrain following shadows aspect encompasses a capability for traversing surfaces that are non-orthogonal to the projected light source. The hazing aspect changes polygon colors as a function of distance and thickness of the haze. The user selectable zoom combines the features of user selectability, zoom and transformation between first and third person perspectives. Lastly, the ground avoidance and autorotation modeling aspects include the advantage of effective use of helicopter controls, and ground avoidance is practiced over terrain having varying altitudes.

While the above detailed description has shown, described and pointed out the fundamental novel features of the invention as applied to various embodiments, it will be understood that various omissions and substitutions and changes in the form and details of the device and process illustrated may be made by those skilled in the art, without departing from the spirit of the invention.

What is claimed:

1. A shadowing system, comprising:

a computer having a processor and a memory;

a visual display connected to the computer;

means for simulating, and displaying on the visual display, a moving object in a universe generated by the computer, wherein the universe includes a terrain defined by a set of planes which includes at least one plane which is non-parallel and non-orthogonal to any other plane in the set; and means for continuously projecting a shadow of the moving object on the terrain, including the non-parallel and non-orthogonal planes, the position of the shadow depending on the position and direction of a simulated light source located above the object in the universe; and means for displaying the shadow on the visual display, thereby improving depth perception.

2. The shadowing system as defined in claim 1, wherein the object is airborne.

3. The shadowing system as defined in claim 2, wherein the system includes control means connected to the computer for maneuvering the object through the universe.

4. The shadowing system as defined in claim 1, wherein the simulated light source is positioned in the range of about 30' to about 90' from the horizontal of the terrain.

5. The shadowing system as defined in claim 1, wherein the shadow provides a visual cue as to the altitude of the object above the terrain.

6. The shadowing system as defined in claim 1, wherein the simulated light source generates essentially parallel rays of light that collide with the object.

7. The shadowing system as defined in claim 6, wherein the shadow is essentially the same size and shape as the object.

8. The shadowing system as defined in claim 1, wherein the object comprises a simulated helicopter.

9. The shadowing system as defined in claim 1, wherein overlap of the object and the shadow is indicative of a collision of the object with the terrain.

10. The shadowing system as defined in claim 9, wherein a single point of the object and a single point of the shadow are used to determine the overlap.

11. The shadowing system as defined in claim 1, additionally comprising another object located between the moving object and the terrain on a line originating at the simulated light source so that the shadow is projected on the other object.

12. The shadowing system as defined in claim 1, wherein a single point of the object is used to project the shadow.

13. The shadowing system as defined in claim 1, wherein the simulated light source is positioned at about 75° from the horizontal of the terrain.

14. A shadowing system, comprising:
   a computer having a processor and a memory;
   a visual display connected to the computer;
   a model process simulating a moving object in a universe generated by the computer, wherein the universe includes a terrain defined by a set of planes which includes at least one plane which is non-parallel and non-orthogonal to any other plane in the set;
   a collision process continuously projecting a shadow of the moving object on the terrain, including the non-parallel and non-orthogonal planes, the position of the shadow depending on the position and direction of a simulated light source located above the object in the universe; and
   a video process displaying the object, the universe and the shadow on the visual display, thereby improving depth perception.

15. The shadowing system as defined in claim 14, wherein the object is airborne.

16. The shadowing system as defined in claim 14, additionally comprising another object located between the moving object and the terrain on a line originating at the simulated light source so that the shadow is projected on the other object.

17. The shadowing system as defined in claim 14, wherein the collision process utilizes a single point of the object to project the shadow.

18. The shadowing system as defined in claim 14, additionally comprising at least one input device connected to the computer controlling the motion of the object in the universe.

19. In a shadowing system, including a computer and a visual display, a method of shadowing an object in motion, the method comprising the steps of:
   simulating, and displaying on the visual display, an object in motion in a universe generated by the computer, wherein the universe includes a terrain defined by a set of planes which includes at least one plane which is non-parallel and non-orthogonal to any other plane in the set; and
   continuously projecting a shadow of the moving object on the terrain, the position of the shadow depending on the position and direction of a simulated light source located above the object in the universe, wherein the light source is non-orthogonal to the normal of a one of the planes of the terrain; and
   displaying the shadow on the visual display, thereby improving depth perception.

20. The shadowing method as defined in claim 19, wherein the object is airborne.

21. The shadowing method as defined in claim 19, additionally including the step of maneuvering the object through the universe.

22. The shadowing method as defined in claim 21, wherein the system additionally comprises at least one input device for controlling the motion of the object.

23. The shadowing method as defined in claim 19, wherein the projecting step comprises the step of generating an essentially parallel set of rays of light from the light source that collide with the object.

24. The shadowing method as defined in claim 19, additionally comprising the step of determining a collision of the object with the terrain.

25. The shadowing method as defined in claim 24, wherein the step of determining the collision includes the step of determining the overlap of a single point of the object and a single point of the shadow.

26. The shadowing method as defined in claim 19, additionally comprising the step of projecting the shadow on another object located between the moving object and the terrain on a line originating at the simulated light source.

27. The shadowing method as defined in claim 19, wherein the step of projecting the shadow of the object utilizes a single point of the object.

28. In a shadowing system, including a computer, a visual display and at least one input device, a method of shadowing an object in motion, the method comprising the steps of:
   moving an input device so as to provide position information about an object;
   simulating the object in motion in a universe generated by the computer, wherein the motion of the object is responsive to the position information, and wherein the universe includes a terrain defined by a set of planes which includes at least one plane which is non-parallel and non-orthogonal to any other plane in the set;
   displaying the object in motion in a portion of the universe on the visual display;
   continuously projecting a shadow of the object on the terrain, including the non-parallel and non-orthogonal planes, the position of the shadow depending on the position and direction of a simulated light source located above the object in the universe; and
   displaying the shadow on the visual display, thereby improving depth perception.

29. The shadowing method as defined in claim 28, wherein the object is airborne.

* * * * *

UNITED STATES PATENT AND TRADEMARK OFFICE
CERTIFICATE OF CORRECTION

PATENT NO. : 5,616,031
DATED : April 1, 1997
INVENTOR(S) : Edward G. Logg

It is certified that error appears in the above-identified patent and that said Letters Patent is hereby corrected as shown below:

Column 26 line 64, delete "30' to about 90'" and substitute --30° to about 90°--

Signed and Sealed this

Sixth Day of October, 1998

Attest:

BRUCE LEHMAN

Attesting Officer

Commissioner of Patents and Trademarks